(12) United States Patent
Roy et al.

(10) Patent No.: US 12,190,062 B2
(45) Date of Patent: Jan. 7, 2025

(54) NATURAL LANGUAGE PROCESSING TECHNIQUES USING HYBRID REASON CODE PREDICTION MACHINE LEARNING FRAMEWORKS

(71) Applicant: Optum, Inc., Minnetonka, MN (US)

(72) Inventors: Suman Roy, Bangalore (IN); Thomas G. Sullivan, St. Paul, MN (US); Vijay Varma Malladi, Hyderabad (IN); Matthew J. Stewart, Plymouth, MN (US); Abraham Gebru Tesfay, Eden Prairie, MN (US); Gaurav Ranjan, Bangalore (IN)

(73) Assignee: Optum, Inc., Minnetonka, MN (US)

( * ) Notice: Subject to any disclaimer, the term of this patent is extended or adjusted under 35 U.S.C. 154(b) by 249 days.

(21) Appl. No.: 17/731,992

(22) Filed: Apr. 28, 2022

(65) Prior Publication Data

US 2023/0351109 A1    Nov. 2, 2023

(51) Int. Cl.
| | |
|---|---|
| *G06F 40/279* | (2020.01) |
| *G06F 40/289* | (2020.01) |
| *G06F 40/30* | (2020.01) |
| *G06N 5/02* | (2023.01) |
| *G06N 20/00* | (2019.01) |

(52) U.S. Cl.
CPC .......... *G06F 40/289* (2020.01); *G06N 5/027* (2013.01)

(58) Field of Classification Search
CPC ...... G06F 40/279; G06F 40/284; G06F 40/30; G06F 40/35; G06N 3/045; G06N 20/00
USPC .................................... 704/1, 9, 10; 706/12
See application file for complete search history.

(56) References Cited

U.S. PATENT DOCUMENTS

| | | | |
|---|---|---|---|
| 9,508,360 B2 | 11/2016 | Allam et al. | |
| 9,911,413 B1 | 3/2018 | Kumar et al. | |
| 9,998,596 B1* | 6/2018 | Dunmire ............. | H04M 3/5158 |
| 10,354,677 B2 | 7/2019 | Mohamed et al. | |
| 11,526,665 B1* | 12/2022 | Hovsepian ............ | G06F 40/284 |
| 2018/0020093 A1 | 1/2018 | Bentitou et al. | |
| 2019/0180175 A1 | 6/2019 | Meteer et al. | |

(Continued)

OTHER PUBLICATIONS

Liu et al., "Hierarchical Transformers for Multi-Document Summarization", Proceedings of the 57th Annual Meeting of the Association for Computational Linguistics, pp. 5070 to 5081, Jul. 28 to Aug. 2, 2019. (Year: 2019).*

(Continued)

*Primary Examiner* — Martin Lerner
(74) *Attorney, Agent, or Firm* — Alston & Bird LLP

(57) ABSTRACT

Various embodiments of the present invention provide methods, apparatus, systems, computing devices, computing entities, and/or the like for performing natural language processing operations using a hybrid reason code prediction machine learning framework. Certain embodiments of the present invention utilize systems, methods, and computer program products that perform natural language processing using a hybrid reason code prediction machine learning framework that comprises one or more of the following: (i) a hierarchical transformer machine learning model, (ii) an utterance prediction machine learning model, (iii) an attention distribution generation machine learning model, (iv) an utterance-code pair prediction machine learning model, and (v) a hybrid prediction machine learning model.

20 Claims, 13 Drawing Sheets

(56) References Cited

U.S. PATENT DOCUMENTS

| | | | |
|---|---|---|---|
| 2020/0027567 A1* | 1/2020 | Xie | G06F 40/284 |
| 2020/0097439 A1* | 3/2020 | Sinay | G06N 20/00 |
| 2020/0226321 A1* | 7/2020 | Burns | G06F 40/174 |
| 2021/0097502 A1 | 4/2021 | Hilleli et al. | |
| 2021/0142789 A1 | 5/2021 | Gurbani et al. | |
| 2021/0142917 A1 | 5/2021 | Kim et al. | |
| 2021/0256220 A1 | 8/2021 | Kaur et al. | |
| 2021/0272571 A1 | 9/2021 | Balasubramaniam et al. | |
| 2022/0004923 A1* | 1/2022 | Kamkar | G06N 20/00 |
| 2022/0101447 A1* | 3/2022 | Hibbert-Iacobacci | G06N 20/20 |
| 2022/0382978 A1* | 12/2022 | Wagner | G06F 40/284 |
| 2023/0063713 A1* | 3/2023 | Lukyanenko | G06F 40/35 |
| 2023/0259708 A1* | 8/2023 | Pouran Ben Veyseh | G06F 40/30 704/232 |
| 2023/0297778 A1* | 9/2023 | Can | G06F 40/284 |

OTHER PUBLICATIONS

Begeja, Lee et al. "Interactive Machine Learning Techniques For Improving SLU Models," In Proceedings of the HLT-NAACL 2004 Workshop On Spoken Language Understanding for Conversational Systems and Higher Level Linguistic Information for Speech Processing, May 2, 2004, pp. 10-16.

Ben-Baruch, Emanuel et al. "Asymmetric Loss For Multi-Label Classification," arXiv preprint arXiv:2009.14119v1 [cs.CV] Sep. 29, 2020, pp. 1-13.

Krishna, Kundan et al. "Extracting Structured Data From Physician-Patient Conversations By Predicting Noteworthy Utterances," arXiv preprint arXiv:2007.07151v1 [cs.LG] Jul. 14, 2020, (14 pages).

Mikolov, Tomas et al. "Distributed Representations of Words and Phrases and their Compositionality," In Advances In Neural Information Processing Systems, vol. 26, Oct. 2013, Conference on Neural Information Processing Systems (NIPS), pp. 1-9, available online at https://proceedings.neurips.cc/paper/2013/file/9aa42b31882ec039965f3c4923ce901b-Paper.pdf.

Xie Pengtao et al. "A Neural Architecture For Automated ICD Coding," In Proceedings of the 56th Annual Meeting of the Association for Computational Linguistics, vol. 1 (Long Papers), Jul. 15-20, 2018, pp. 1066-1076, available online at https://aclanthology.org/P18-1098.pdf.

Zhang, Xingxing et al. "HIBERT—Document Level Pre-Training of Hierarchical Bidirectional Transformers For Document Summarization," arXiv preprint arXiv:1905.06566v1 [cs.CL] May 16, 2019, (11 pages), available online at https://arxiv.org/pdf/1905.06566.pdf.

\* cited by examiner

Channel 0: Thank you so much for calling my name is janie may start with your name please
Channel 1: Right this is Jim Gardner I'm the customer service supervisor at Harvard benefits office
Channel 0: OK and how can I help you today
Channel 1: I'm on the phone actually with the pharmacy who's calling
Channel 0: for I guess one of our either employees or a spouse and I can't find her record the name is Mary peretti
  PERETTI
Channel 1: she's in a long term care facility and they're trying to get medication 4 and stuff so I just don't know
Channel 0: what's the date of birth
Channel 1: I don't even have that
Channel 0: I don't have any other information that I can share guy over optimize the number
Channel 1: yeah The thing is that we don't have access to viewing employee information that's locked for us
Channel 0: so how about if I gave you her optum ID number
Channel 1: let's try that
Channel 0: uh-huh
Channel 1: 1413
Channel 1: 111
Channel 1: 619
Channel 1: 11370
Channel 0: 11370
Channel 1: 1
Channel 0: OK
Channel 1: yeah I'm not pulling anything up with that information
Channel 1: OK
Channel 0: And I know that when it comes to any employees even if we were to be able to go ahead and pull it up it looks
  it for us we're not able to see it but I think those calls go to Lyle
Channel 1: OK
Channel 1: can we try I misspelled are lasking can we try PERETTI

1003

1002 Predicted Call Reason: Customer Service Refill

- Home Delivery – Cust Svc Refill
- Home Delivery – Non_Wismo Order Inquiry
- Home Delivery – Accounting
- Home Delivery – (WISMO) Where is My Order
- Benefits & Coverage – Drug Pricing/Copay
- Claims Processing – Claim Adjudication Explanation/Trouble Shoot Rejected Claim
- Home Delivery – RPh/Clinical Requests
- Benefits & Coverage – Eligibility Inquiry/Update
- Home Delivery – Account Set Up
- Portal – Web Login
- Benefits & Coverage – Formulary Look Up
- Home Delivery – Member Profile Update
- Benefits & Coverage – Prior Authorization Status
- Home Delivery – Resend
- Home Delivery – PSC Request
- Benefits & Coverage – Material/ID Card Request
- Benefits & Coverage – Accumulator Inquiry
- Portal – Web Portal/Mobile App Assistance Channel 0: Thank you so much for calling my name is Junie may start with your name please
Channel 1: Right this is Jim Gardner I'm the customer service supervisor at Harvard benefits office
Channel 0: OK and how can I help you today
Channel 1: I'm on the phone actually with the pharmacy who's calling
Channel 1: for I guess one of our either employees or a spouse and I can't find her record the name is Mary peretti PERETTI
Channel 1: she's in a long term care facility and they're trying to get medication 4 and stuff so I just don't know
Channel 0: what's the date of birth
Channel 1: I don't even have that
Channel 1: I don't have any other information that I can share guy ever optimize the number
Channel 0: yeah The thing is that we don't have access to viewing employee information that's locked for us
Channel 1: So how about if I gave you her member ID number
Channel 0: OK let's go ahead and
Channel 1: let's try that
Channel 0: uh-huh
Channel 1: 1413
Channel 1: 111
Channel 1: 639
Channel 1: 113701
Channel 0: 11370
Channel 1: 1
Channel 0: OK
Channel 0: yeah I'm not pulling anything up with that information
Channel 1: OK
Channel 0: And I know that when it comes to any employees even if we were to be able to go ahead and pull it up it locks it for us we're not able to see it but I think those calls go to Lyle
Channel 1: OK
Channel 1: can we try I misspelled are lasting can we try PERETTI

FIG. 12

NATURAL LANGUAGE PROCESSING TECHNIQUES USING HYBRID REASON CODE PREDICTION MACHINE LEARNING FRAMEWORKS

BACKGROUND

Various embodiments of the present invention address technical challenges related to performing natural language processing and provide solutions to address the efficiency and reliability shortcomings of existing natural language processing solutions.

BRIEF SUMMARY

In general, various embodiments of the present invention provide methods, apparatus, systems, computing devices, computing entities, and/or the like for performing natural language processing operations using a hybrid reason code prediction machine learning framework. Certain embodiments of the present invention utilize systems, methods, and computer program products that perform natural language processing using a hybrid reason code prediction machine learning framework that comprises one or more of the following: (i) a hierarchical transformer machine learning model, (ii) an utterance prediction machine learning model, (iii) an attention distribution generation machine learning model, (iv) an utterance-code pair prediction machine learning model, and (v) a hybrid prediction machine learning model.

In accordance with one aspect, a method is provided. In one embodiment, the method comprises: identifying a plurality of utterances of the document data object; for each utterance, using an utterance prediction machine learning model of a hybrid reason code prediction machine learning framework and based at least in part on an utterance hidden representation for the utterance, generating an utterance markedness likelihood value; for each utterance-code pair that is associated with a particular utterance of the plurality of utterances and a particular reason code of the plurality of reason codes: (i) generating, using an utterance-code pair prediction machine learning model of the hybrid reason code prediction machine learning framework, and based at least in part on the utterance hidden representation for the particular utterance and a reason code hidden representation for the particular reason code, a conditional code-to-utterance assignment likelihood value; and (ii) generating, using a hybrid prediction machine learning model of the hybrid reason code prediction machine learning framework, and based at least in part on the utterance markedness likelihood value for the particular utterance and the conditional code-to-utterance assignment likelihood value for the utterance-code pair, a hybrid reason code assignment likelihood value for the utterance-code pair; determining the hybrid reason code prediction based at least in part on each hybrid reason code assignment likelihood value, wherein the hybrid reason code prediction describes a selected utterance of the plurality of utterances and a selected reason code of the plurality of reason codes; and performing one or more prediction-based actions based at least in part on the hybrid reason code prediction.

In accordance with another aspect, a computer program product is provided. The computer program product may comprise at least one computer-readable storage medium having computer-readable program code portions stored therein, the computer-readable program code portions comprising executable portions configured to: identify a plurality of utterances of the document data object; for each utterance, using an utterance prediction machine learning model of a hybrid reason code prediction machine learning framework and based at least in part on an utterance hidden representation for the utterance, generate an utterance markedness likelihood value; for each utterance-code pair that is associated with a particular utterance of the plurality of utterances and a particular reason code of the plurality of reason codes: (i) generate, using an utterance-code pair prediction machine learning model of the hybrid reason code prediction machine learning framework, and based at least in part on the utterance hidden representation for the particular utterance and a reason code hidden representation for the particular reason code, a conditional code-to-utterance assignment likelihood value; and (ii) generate, using a hybrid prediction machine learning model of the hybrid reason code prediction machine learning framework, and based at least in part on the utterance markedness likelihood value for the particular utterance and the conditional code-to-utterance assignment likelihood value for the utterance-code pair, a hybrid reason code assignment likelihood value for the utterance-code pair; determine the hybrid reason code prediction based at least in part on each hybrid reason code assignment likelihood value, wherein the hybrid reason code prediction describes a selected utterance of the plurality of utterances and a selected reason code of the plurality of reason codes; and perform one or more prediction-based actions based at least in part on the hybrid reason code prediction.

In accordance with yet another aspect, an apparatus comprising at least one processor and at least one memory including computer program code is provided. In one embodiment, the at least one memory and the computer program code may be configured to, with the processor, cause the apparatus to: identify a plurality of utterances of the document data object; for each utterance, using an utterance prediction machine learning model of a hybrid reason code prediction machine learning framework and based at least in part on an utterance hidden representation for the utterance, generate an utterance markedness likelihood value; for each utterance-code pair that is associated with a particular utterance of the plurality of utterances and a particular reason code of the plurality of reason codes: (i) generate, using an utterance-code pair prediction machine learning model of the hybrid reason code prediction machine learning framework, and based at least in part on the utterance hidden representation for the particular utterance and a reason code hidden representation for the particular reason code, a conditional code-to-utterance assignment likelihood value; and (ii) generate, using a hybrid prediction machine learning model of the hybrid reason code prediction machine learning framework, and based at least in part on the utterance markedness likelihood value for the particular utterance and the conditional code-to-utterance assignment likelihood value for the utterance-code pair, a hybrid reason code assignment likelihood value for the utterance-code pair; determine the hybrid reason code prediction based at least in part on each hybrid reason code assignment likelihood value, wherein the hybrid reason code prediction describes a selected utterance of the plurality of utterances and a selected reason code of the plurality of reason codes; and perform one or more prediction-based actions based at least in part on the hybrid reason code prediction.

BRIEF DESCRIPTION OF THE DRAWINGS

Figure 1:
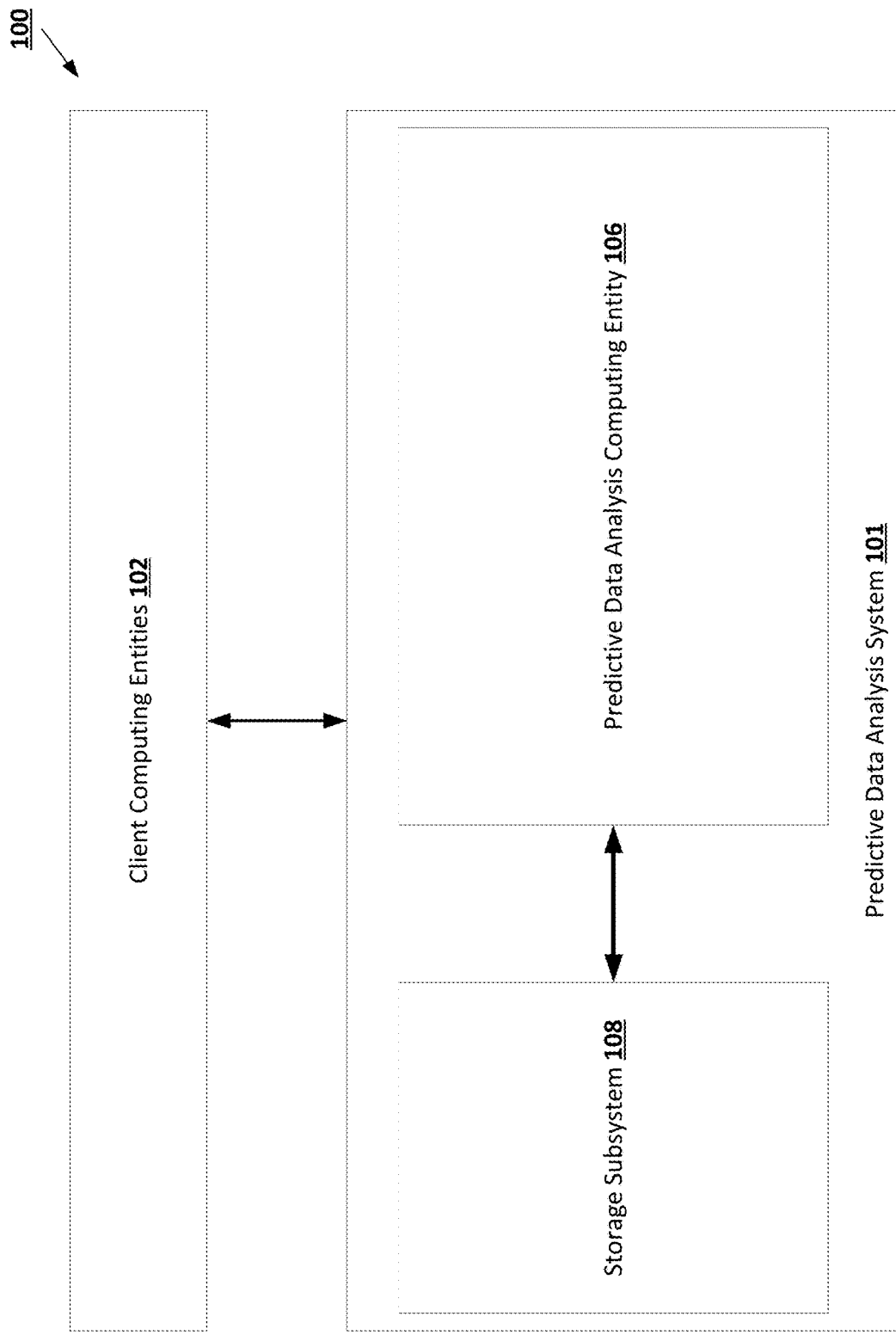

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
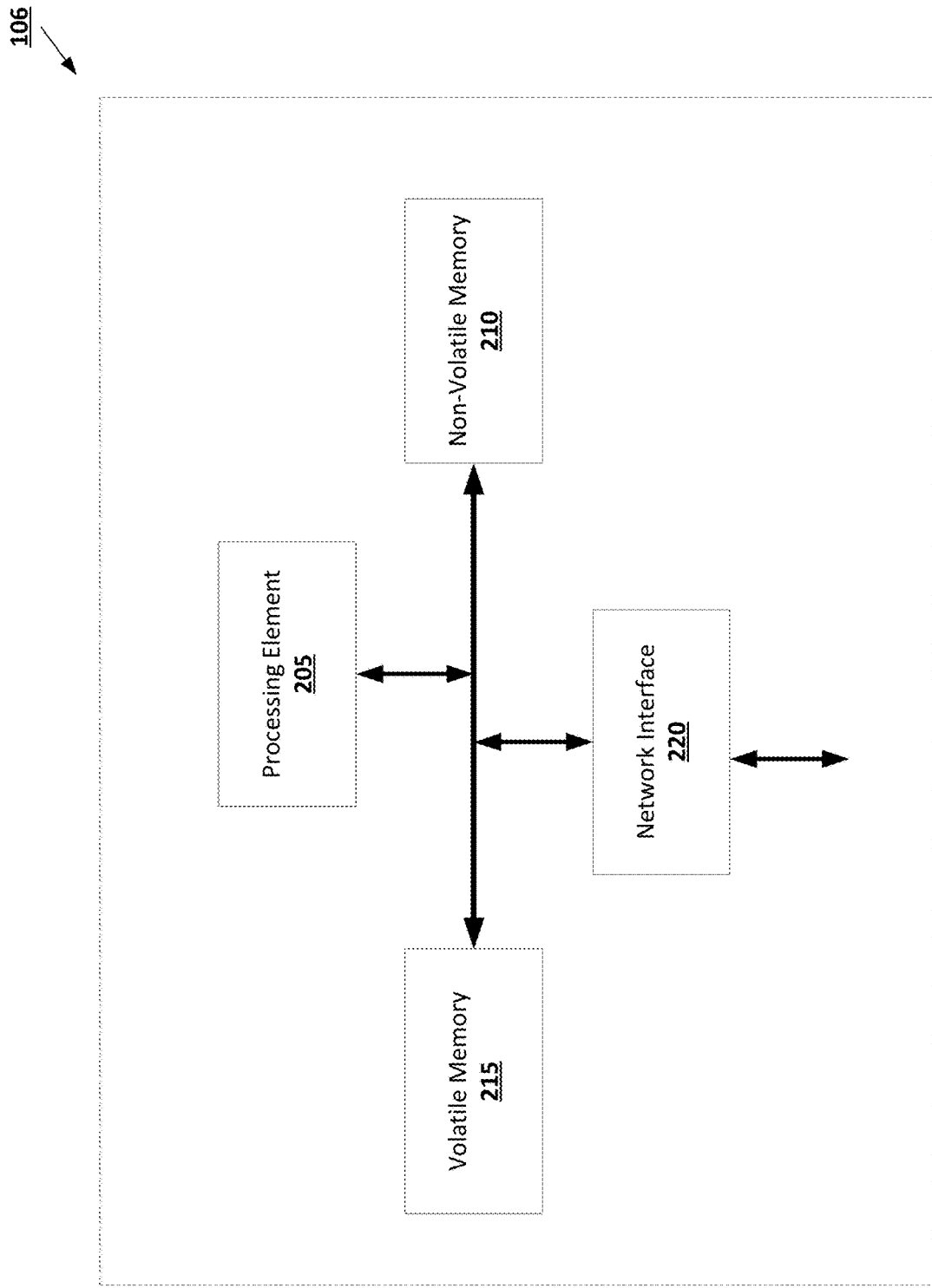

FIG. 2 provides an example predictive data analysis computing entity in accordance with some embodiments discussed herein.

Figure 3:
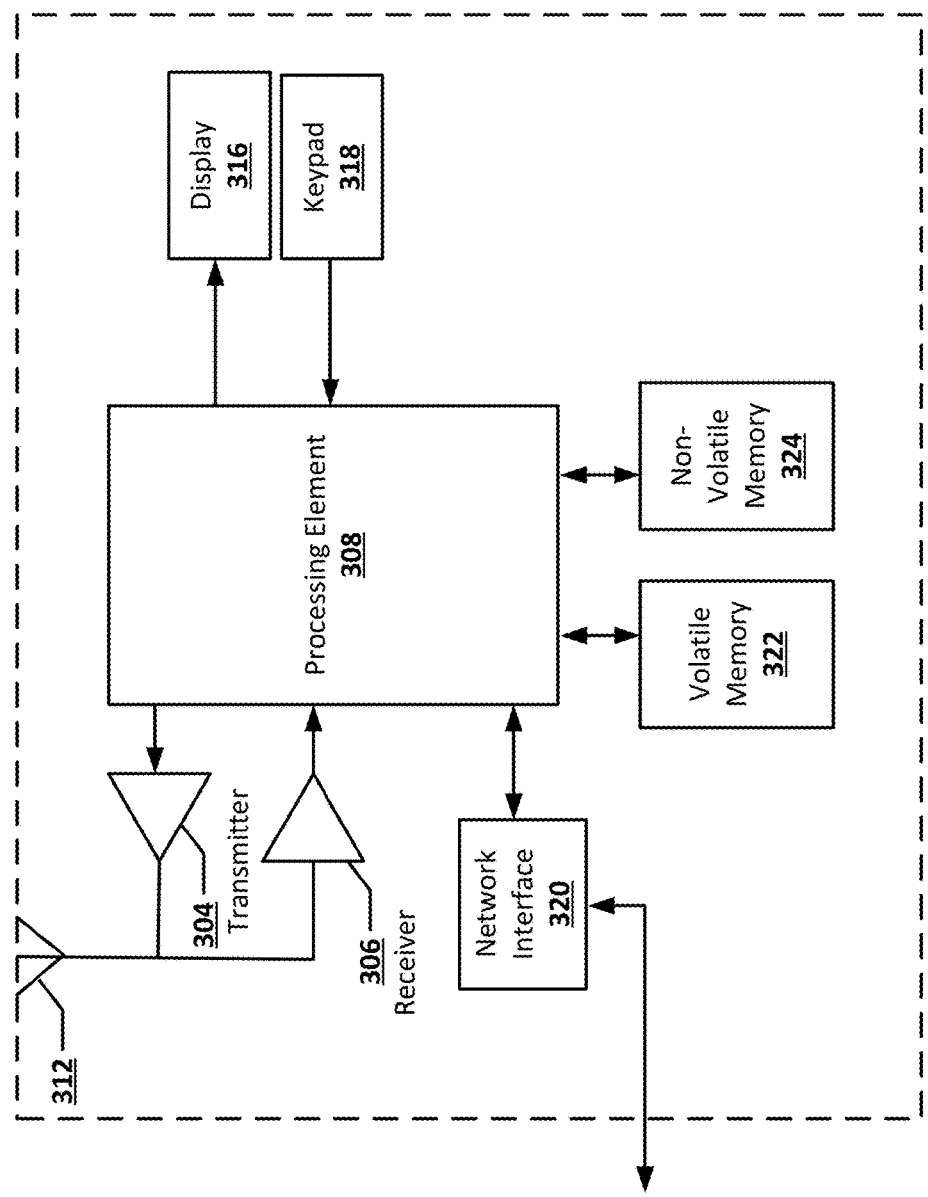

FIG. 3 provides an example client computing entity in accordance with some embodiments discussed herein.

Figure 4:
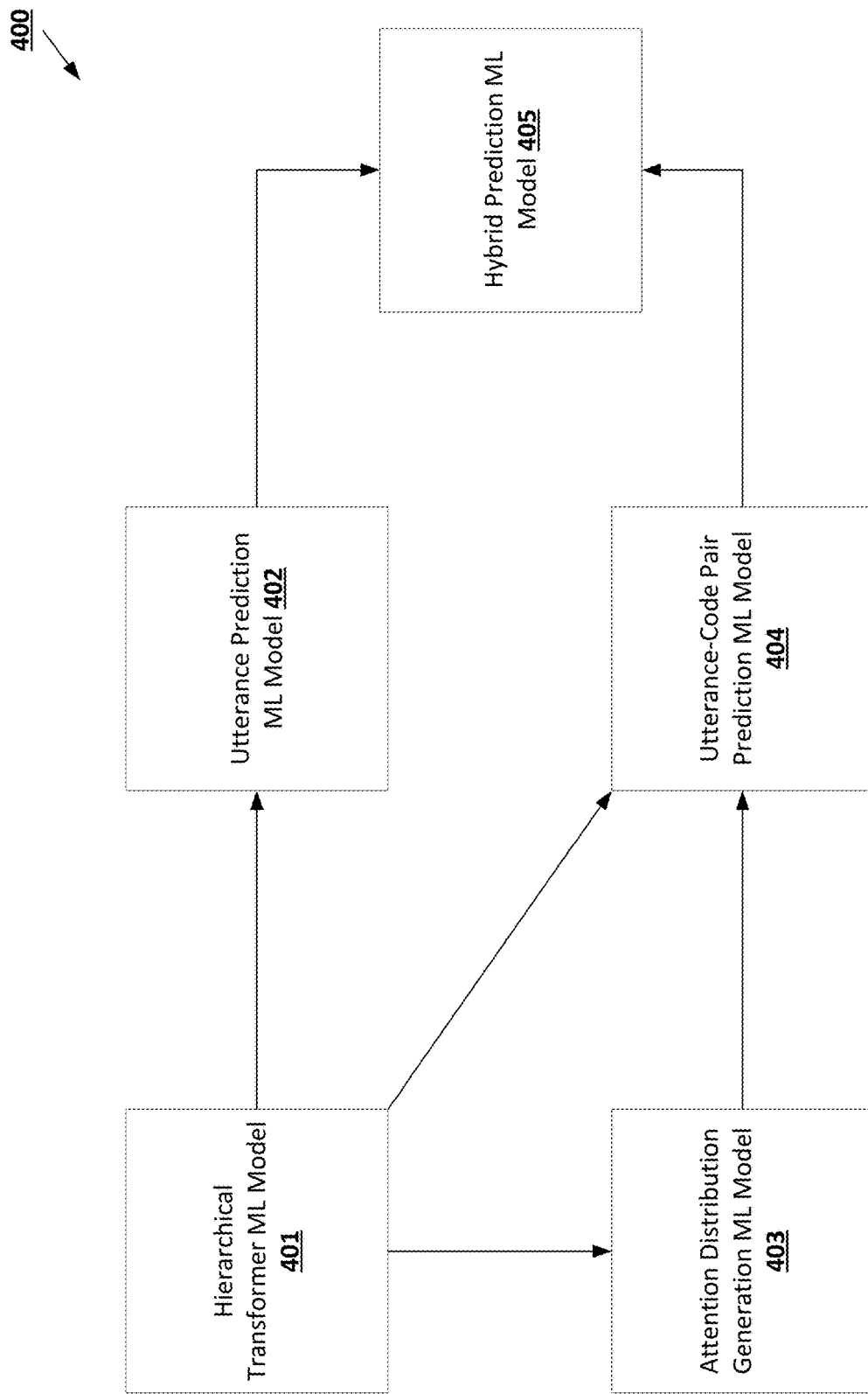

FIG. 4 is a block diagram of an example of a hybrid reason code prediction machine learning framework in accordance with some embodiments discussed herein.

Figure 5:
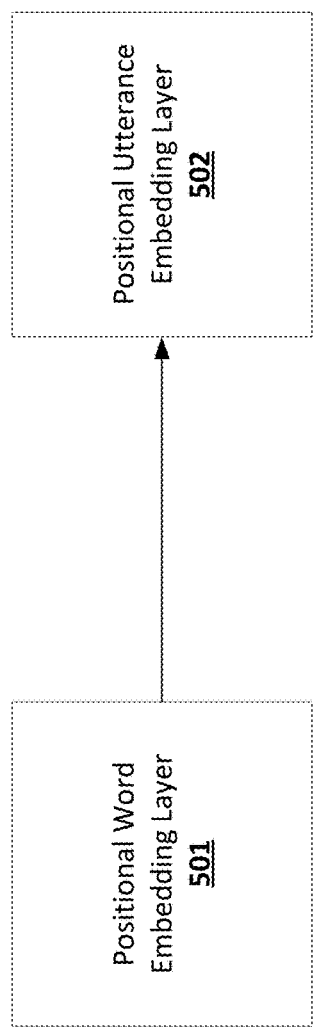

FIG. 5 provides an operational example of a hierarchical transformer machine learning model in accordance with some embodiments discussed herein.

Figure 6:
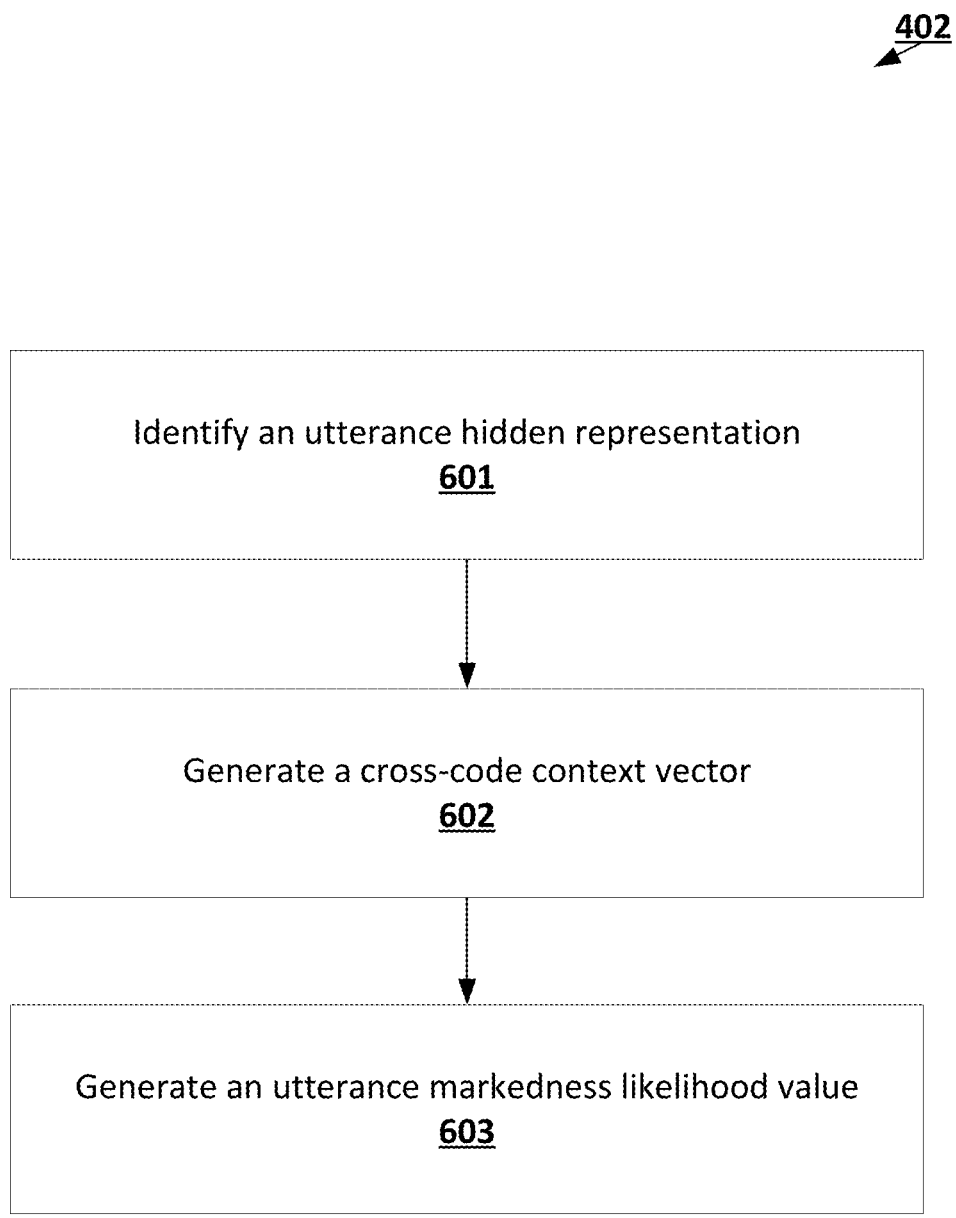

FIG. 6 is a flowchart diagram of an example process for generating the utterance markedness likelihood value for an utterance in accordance with some embodiments discussed herein.

Figure 7:
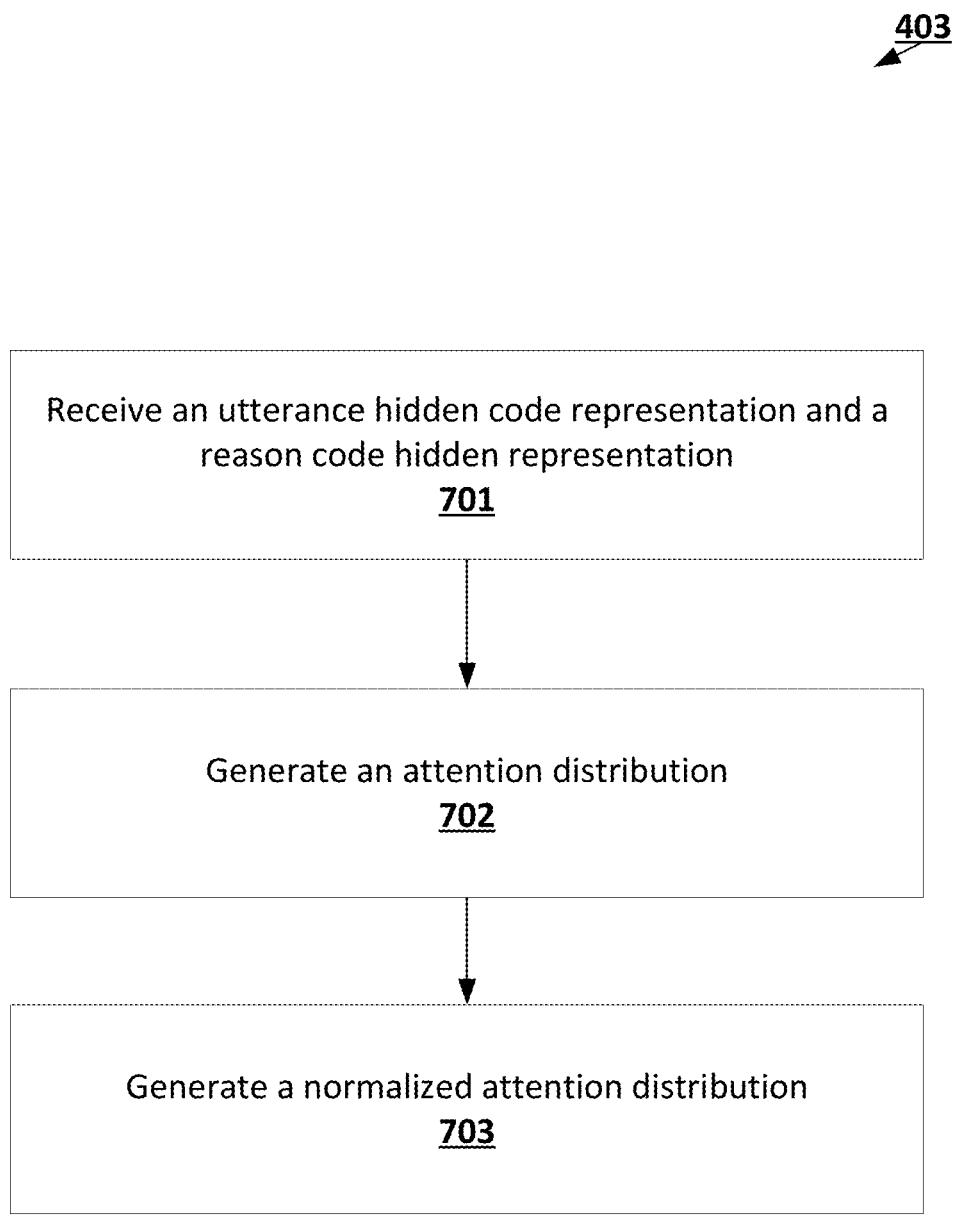

FIG. 7 is a flowchart diagram of an example process for generating the normalized attention distribution for a particular utterance-code pair that comprises an ith utterance of the C utterances of the document data object and an nth reason code of the N reason codes in accordance with some embodiments discussed herein.

Figure 8:
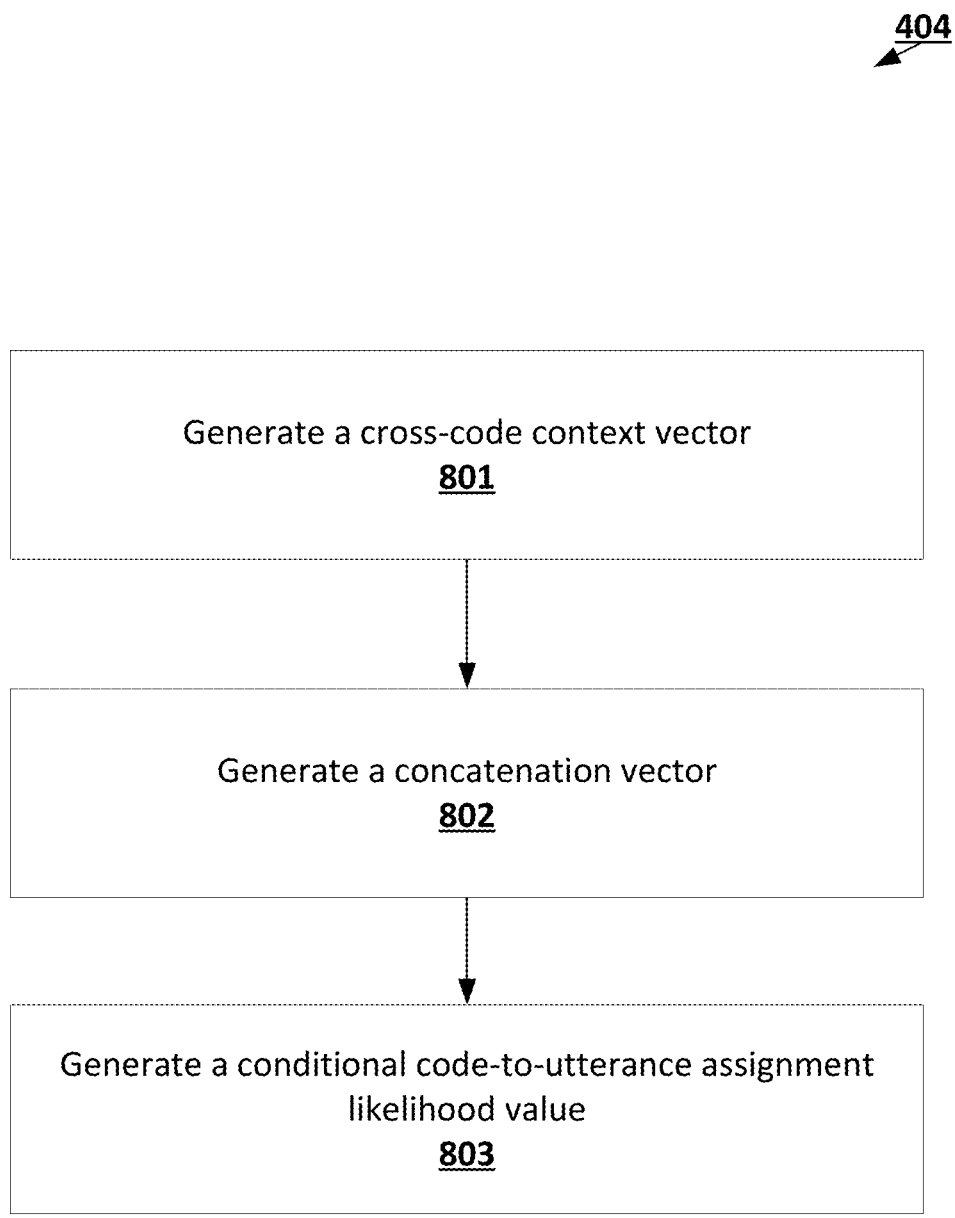

FIG. 8 is a flowchart diagram of an example process for generating the conditional code-to-utterance assignment likelihood value for a particular utterance-code pair that comprises an ith utterance of the C utterances of the document data object and an nth reason code of the N reason codes in accordance with some embodiments discussed herein.

Figure 9:
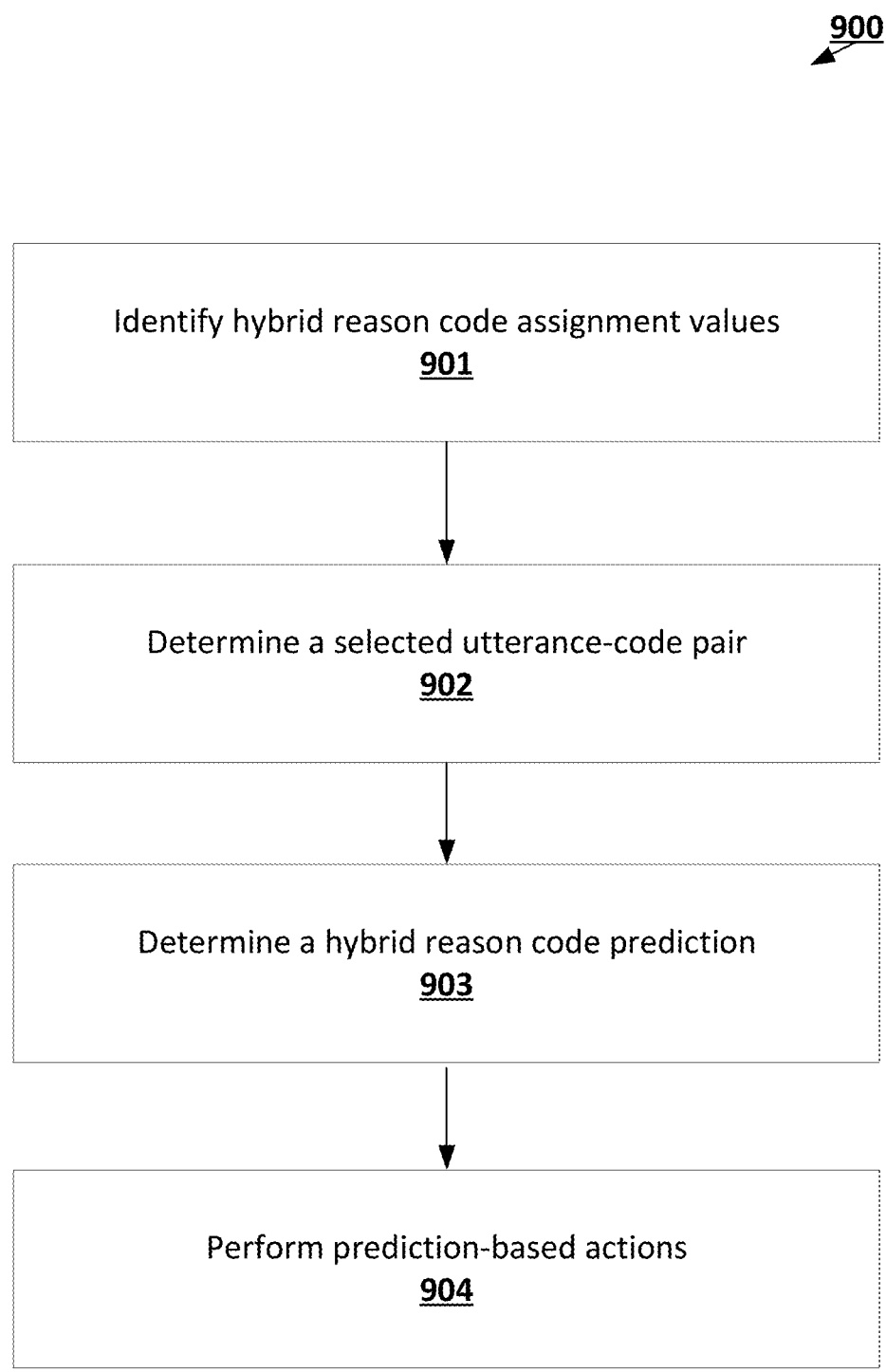

FIG. 9 is a flowchart diagram of an example process for generating the hybrid reason code prediction for a document data object in accordance with some embodiments discussed herein.

FIG. 10 provides an operational example of a prediction output user interface in accordance with some embodiments discussed herein.

FIG. 11 provides an operational example of a set of reason codes in accordance with some embodiments discussed herein.

FIG. 12 provides an operational example of natural language content data associated with a document data object in accordance with some embodiments discussed herein.

Figure 13:
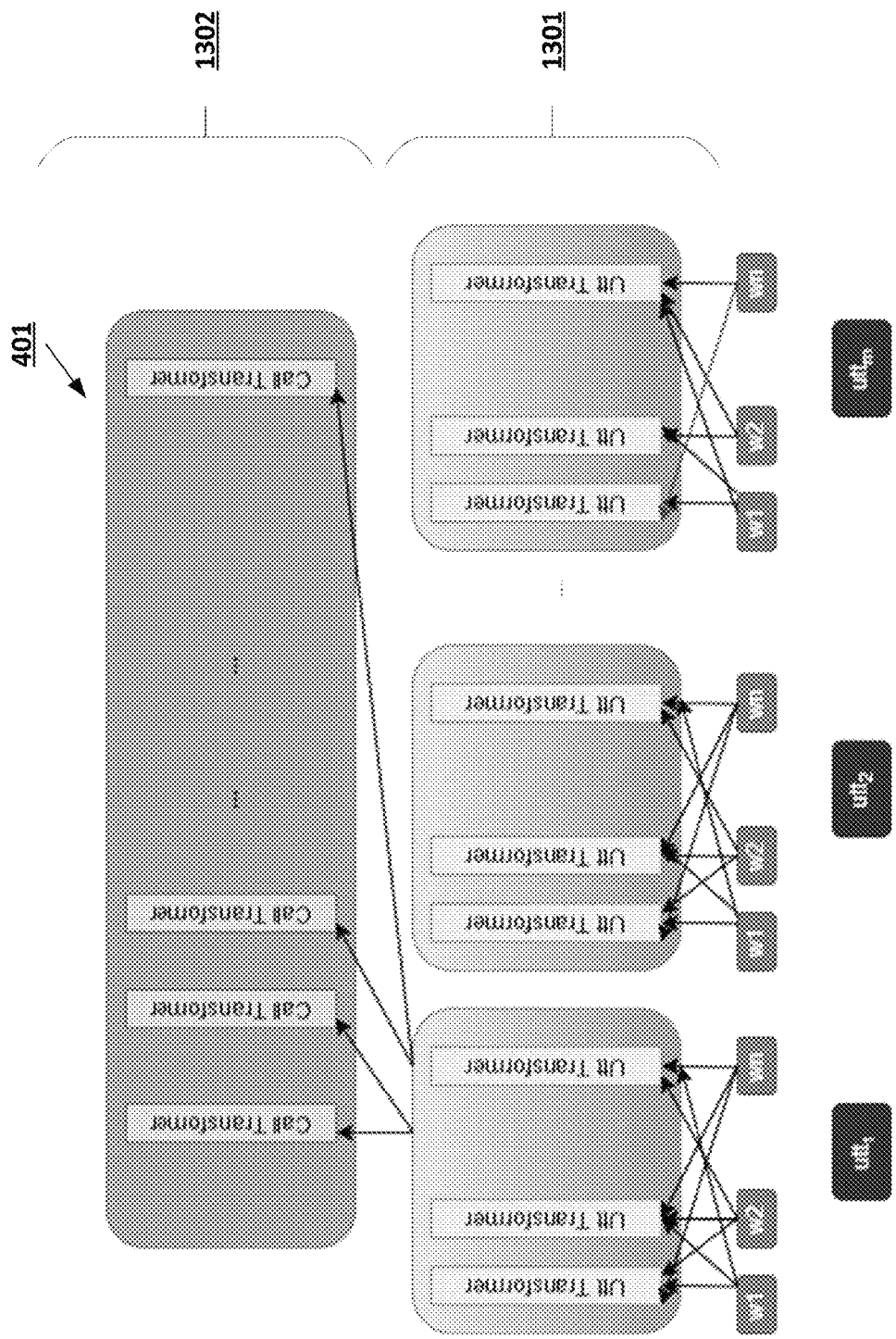

FIG. 13 provides an operational example of a hierarchical transformer machine learning model in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Improvements

Various embodiments of the present invention address technical challenges associated with reducing computational complexity of performing online predictive data analysis with respect to a document data object having C utterances by enabling techniques that enable sequential comparison of predictive outputs across N*C utterance-code pairs (where N describes a number of defined reason codes). For example, in some embodiments, during the online prediction embodiments described above: (i) if the current iteration is a process for determining predictive outputs is an initial iteration that is associated with an initial utterance in the ordered sequence of C utterances associated with the document data object, then of all of the N hybrid reason code assignment likelihood values that are associated with utterance-code pairs for the initial utterance across the N reason codes, the highest hybrid reason code assignment likelihood value is identified and the utterance-code pair that is associated with the identified highest hybrid reason code assignment likelihood value is selected as the selected utterance-code pair, and (ii) if the current iteration of the process is a non-initial jth iteration that is associated with a corresponding non-initial jth utterance in the ordered sequence of C utterances associated with the document data object, then of all of the N hybrid reason code assignment likelihood values that are associated with utterance-code pairs for the initial utterance across the N reason codes, the highest hybrid reason code assignment likelihood value is identified and the utterance-code pair that is associated with the identified highest hybrid reason code assignment likelihood value is selected as the selected utterance-code pair if the identified highest hybrid reason code assignment likelihood value is greater than to (or alternatively greater than or equal to) the hybrid reason code assignment likelihood value for a selected utterance-code pair that is selected by a preceding iteration of the described process.

In some embodiments (e.g., during an online generation of a hybrid reason code prediction for a document data object, such as during a real-time and/or a near-real-time generation of a hybrid reason code prediction for a document data object), by enabling sequential comparison of predictive outputs across N*C utterance-code pairs, various embodiments of the present invention reduce the complexity of computational operations that need to performed during each iteration from O(N*C) to O(N), thus reducing the amount of computational resources that are needed to perform comparison of predictive outputs across N*C utterance-code pairs at each time. In this way, various embodiments of the present invention make important technical contributions to improving computational efficiency of existing natural language processing systems.

Moreover, various embodiments of the present invention make important technical contributions to improving resource-usage efficiency of post-prediction systems by using hybrid reason code predictions to set the number of allowed computing entities used by the noted post-prediction systems. For example, in some embodiments, a predictive data analysis computing entity determines D investigation classifications for D document data objects based at least in part on the D hybrid reason code predictions for the D document data objects. Then, the count of document data objects that are associated with an affirmative investigation classification, along with a resource utilization ratio for each document data object, can be used to predict a predicted number of computing entities needed to perform post-prediction processing operations (e.g., automated investigation operations) with respect to the D document data objects. For example, in some embodiments, the number of computing entities needed to perform post-prediction processing operations (e.g., automated investigation operations) with respect to D document data objects can be determined based at least in part on the output of the equation: R=ceil($\Sigma_k^{k=K} ur_k$), where R is the predicted number of computing entities needed to perform post-prediction processing operations with respect to the D document data object, ceil(.) is a ceiling function that returns the closest integer that is greater than or equal to the value provided as the input parameter of the ceiling function, k is an index variable that iterates over K document data objects among the D document data that are associated with affirmative investigative classifications, and $ur_k$ is the estimated resource utilization ratio for a kth document data object that may be determined based at least in part on a count of utterances/tokens/words in the kth document data object. In some embodiments, once R is generated, the predictive data analysis computing entity can use R to perform operational load balancing for a server system that is configured to perform post-prediction processing operations (e.g., automated investigation operations) with respect to D document data objects. This may be done by allocating computing entities to the post-prediction processing operations if the number of currently-allocated computing entities is below R, and deallocating currently-allocated computing entities if the number of currently-allocated computing entities is above R.

II. Definitions of Certain Terms

The term "document data object" may refer to a data construct that describes a collection of natural language content data. An example of a document data object is a document data object that describes transcript of a call. Another example of a document data object is a document data object that describes an email chain. In some embodiments, each document data object comprises C (e.g., one or more, two or more) utterances (e.g., sentences), where an utterance may be a semantically independent subset of natural language content data described by the document data object. An operational example of a document data object is depicted in FIG. 12.

The term "reason code" may refer to a data construct that describes a subject matter classification that may be associated with a document data object in accordance with various embodiments of the present invention. An example of a reason code is a reason code describing that a document data object relates to refilling a prescription, a reason code describing that a document data object relates to scheduling appointments, and/or the like. An operational example of a set of reason codes is depicted in FIG. 11. In some embodiments, given a document data object, a predictive data analysis computing entity recommends a reason code for the document data object, and marks an utterance of the document data object as being most related to the recommended reason code. In some embodiments, a reason code hidden representation is a fixed-size representation of a reason code that is generated during training of a hybrid reason code prediction machine learning framework.

The term "hybrid reason code prediction machine learning framework" may refer to a data construct that describes parameters, hyperparameters, and/or defined operations of a collection of machine learning models that are collectively configured to process a document data object to generate, for each utterance-code pair associated with the document data object, a hybrid reason code assignment likelihood value that describes an estimated likelihood that both of the following are true: (i) the utterance associated with the utterance-code pair is the marked (e.g., most semantically significant) utterance of the document data object, and (ii) the reason code associated with the utterance-code pair is the most relevant reason code for the document data object. In some embodiments, the hybrid reason code prediction machine learning framework comprises one or more of the following: (i) a hierarchical transformer machine learning model, (ii) an utterance prediction machine learning model, (iii) an attention distribution generation machine learning model, (iv) an utterance-code pair prediction machine learning model, and (v) a hybrid prediction machine learning model. In some embodiments, inputs to the hybrid reason code prediction machine learning framework include, for each utterance of a document data object, a set of W vectors describing input vector representations of W words of the utterance (e.g., including a word corresponding to an end-of-utterance token). In some embodiments, inputs to the hybrid reason code prediction machine learning framework include, for each reason code of N reason codes, a vector describing a reason code hidden representation of the reason code. In some embodiments, outputs of the hybrid reason code prediction machine learning framework include, for each utterance-code pair of a set of utterance-code pairs associated with a document data object, a vector and/or an atomic value describing the hybrid reason code assignment likelihood value for the utterance-code pair. In some embodiments, the various machine learning models of a hybrid reason code prediction machine learning framework use operations of at least one of the Equation 1, the Equation 2, and the Equation 3 described below.

The term "hierarchical transformer machine learning model" may refer to a data construct that describes parameters, hyperparameters, and/or defined operations of a machine learning model that is configured to generate, for each utterance of C utterances of a document data object, a respective utterance hidden representation that may be a fixed-size representation of the utterance. In some embodiments, the hierarchical transformer machine learning model comprises a Hierarchical Bidirectional Encoder Representations from Transformers (HIBERT) machine model. Aspects of HIBERT models are described in Zhang et al., *HIBERT: Document Level Pre-training of Hierarchical Bidirectional Transformers for Document Summarization* (2019), arXiv:1905.06566v1. In some embodiments, inputs to a hierarchical transformer machine learning model comprise, for each ith utterance of C utterances, a set of W vectors each describing an input vector representation of one of the W words of the ith utterance (e.g., including a word corresponding to an end-of-utterance token). In some embodiments, outputs of a hierarchical transformer machine learning model, for each ith utterance of C utterances, a vector describing an utterance hidden representation of the ith utterance (e.g., including a word corresponding to an end-of-utterance token). In some embodiments, outputs of a hierarchical transformer machine learning model include a vector describing a final value of a vector describing an utterance hidden representation of the ith utterance (e.g., including a word corresponding to an end-of-utterance token).

The term "utterance prediction machine learning model" may refer to a data construct that describes parameters, hyperparameters, and/or defined operations of a machine learning model that is configured to generate, for each utterance of C utterances of a document data object, an utterance markedness likelihood value that describes a predicted likelihood that the utterance is the single utterance of the C utterances that best describes the association of the document data object with a selected reason code for the document data object. In some embodiments, the utterance prediction machine learning model is configured to, for each utterance, process the utterance hidden representation of the utterance to generate an value that describes a likelihood that the utterance is the most reason-code-indicative utterance of the C utterances of the document data object. In some embodiments, to generate the utterance markedness likelihood value for the ith utterance, the utterance prediction machine learning model performs the operations of the following equation: $P(u_i)=\sigma(w_a^T[x'_i; \hat{h}_i]+b_a)$, where $x'_i$ is the cross-code context vector for the ith utterance, $\hat{h}_i$ is the utterance hidden representation for the ith utterance, $[x'_i; \hat{h}_i]$ is the concentration vector generated by concatenating $x'_i$ and $\hat{h}_i$, $w_a^T$ is the transpose matrix generated by transposing the trained parameter matrix $w_a$, $b_a$ is a trained parameter vector, $\sigma$ is an activation function such as the sigmoid function, $u_i$ is the ith utterance, and $P(u_i)$ is the utterance markedness likelihood value for $u_i$. In some embodiments, inputs to the utterance prediction machine learning model include, for each utterance of C utterances of a document data object, a vector describing the utterance hidden representation of the noted utterance. In some embodiments, outputs of the utterance prediction machine learning model include, for each utterance of C utterances of a document data object, a vector and/or an atomic value describing the utterance markedness likelihood value for the utterance.

The term "attention distribution generation machine learning model" may refer to a data construct that describes parameters, hyperparameters, and/or defined operations of a machine learning model that is configured to generate a normalized attention distribution for each utterance-code pair that comprises an ith utterance of the C utterances of the document data object and an nth reason code of the N reason codes. In some embodiments, given C utterances and N reason codes, C*N utterance-code pairs are generated comprising each possible pairings of an utterance and a reason code. Afterward, for each utterance-code pair of the C*N utterance-code pairs, a normalized attention distribution is generated. In some embodiments, to generate the normalized attention distribution for the particular utterance-code pair that is associated with an ith utterance and an nth reason code, the operations corresponding to the following equation are performed:

$$c'_{n,i} = \frac{\exp(c_{ni})}{\sum_{j=1}^{c} \exp(c_{n,i})},$$

where $c'_{n,i}$ is the normalized attention distribution for the particular utterance-code pair that comprises the ith utterance of the C utterances of the document data object and the nth reason code of the N reason codes, exp(.) is the exponential function, $c_{n,i}$ is the attention distribution for the particular utterance-code pair that comprises the ith utterance of the C utterances of the document data object and the nth reason code of the N reason codes, and j is an index variable that iterates over C utterances of the document data object. In some embodiments, inputs to the attention distribution generation machine learning model include, for each utterance-code pair, a vector describing the utterance hidden representation of the utterance associated with the utterance-code pair and a vector describing the reason code hidden representation of the utterance associated with the utterance-code pair. In some embodiments, outputs of the attention distribution generation machine learning model include, for each utterance-code pair, a vector describing the normalized attention distribution of the utterance-code pair.

The term "utterance-code pair prediction machine learning model" may refer to a data construct that describes parameters, hyperparameters, and/or defined operations of a machine learning model that is configured to generate a conditional code-to-utterance assignment likelihood value for each utterance-code pair that comprises an ith utterance of the C utterances of the document data object and an nth reason code of the N reason codes. In some embodiments, given C utterances and N reason codes, C*N utterance-code pairs are generated comprising each possible pairings of an utterance and a reason code. Afterward, for each utterance-code pair of the C*N utterance-code pairs, a conditional code-to-utterance assignment likelihood value is generated. In some embodiments, to generate the conditional code-to-utterance assignment likelihood value for the particular utterance-code pair that is associated with an ith utterance and an nth reason code, the utterance-code pair prediction machine learning model performs operations of the equation: $P(r_n|u_i)=\sigma(w_n^T[\hat{h}_i; h'_n; x_n]+b_n)$, where $r_n$ is the nth reason code, $u_i$ is the ith utterance, $P(r_n|u_i)$ is the conditional code-to-utterance assignment likelihood value for the utterance-code pair comprising $r_n$ and $u_i$, $\sigma$ is an activation function such as a sigmoid activation function, $w_n$ is a matrix of trained parameters of the utterance-code pair prediction machine learning model, $\hat{h}_i$ is the utterance hidden representation for the ith utterance, $h'_n$ is the cross-utterance context vector for the nth reason code, $x_n$ is the reason code hidden representation for the nth reason code, $[\hat{h}_i; h'_n; x_n]$ is the concatenation vector generated by concatenating $\hat{h}_i$, $h'_n$, and $x_n$, and $b_n$ is a vector of trained parameters of the utterance-code pair prediction machine learning model. In some embodiments, inputs to the utterance-code pair prediction machine learning model comprise, for each utterance-code-pair, at least one of the following: a vector describing the utterance hidden representation for the utterance associated with the utterance-code pair, a vector describing the reason code hidden representation associated with the utterance-code pair, and a vector describing the cross-utterance context vector for the utterance code associated with the utterance-code pair. In some embodiments, outputs of the utterance-code pair prediction machine learning model include, for each utterance-code pair, a vector and/or an atomic value describing the conditional code-to-utterance assignment likelihood value for the utterance-code pair.

The term "hybrid prediction machine learning model" may refer to a data construct that describes parameters, hyperparameters, and/or defined operations of a machine learning model that is configured to generate a hybrid reason code assignment likelihood value for each utterance-code pair that comprises an ith utterance of the C utterances of the document data object and an nth reason code of the N reason codes. In some embodiments, to generate a hybrid reason code assignment likelihood value for an utterance-code pair that is associated with an ith utterance and an nth reason code, the hybrid prediction machine learning model uses (e.g., multiplies) the utterance markedness likelihood value for the ith utterance and the conditional code-to-utterance assignment likelihood value for the utterance-code pair. In some embodiments, to generate a hybrid reason code assignment likelihood value for an utterance-code pair that is associated with an ith utterance and an nth reason code, the hybrid prediction machine learning model performs the operations of the following equation: $P(r_n, u_i)=P(r_n|u_i)*P(u_i)$, where $r_n$ is the nth reason code, $u_i$ is the ith utterance, $P(r_n|u_i)$ is the conditional code-to-utterance assignment likelihood value for the utterance-code pair comprising $r_n$ and $u_i$, $P(u_i)$ is the utterance markedness likelihood value for $r_n$, and $P(r_n, u_i)$ is the hybrid reason code assignment likelihood value for the utterance-code pair comprising $r_n$ and $u_i$. In some embodiments, inputs to the hybrid prediction machine learning model include, for each utterance-code pair of a set of utterance-code pairs associated with a document data object, a vector and/or an atomic value describing the conditional code-to-utterance assignment likelihood value. In some embodiments, inputs to the hybrid prediction machine learning model include, for each utterance, a vector and/or an atomic value describing the utterance markedness likelihood value. In some embodiments, outputs of the hybrid prediction machine learning model include, for each utterance-code pair of a set of utterance-code pairs associated with a document data object, a vector and/or an atomic value describing the hybrid reason code assignment likelihood value for the utterance-code pair.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions.

An example of a prediction-based action that can be performed using the predictive data analysis system 101 is a request for generating a reason code for a call as well as detecting a marked utterance of the call based at least in part on the call transcript for the call. Other examples of prediction-based actions include generating notifications, automatically scheduling appointments, automatically generating prescriptions, automatically generating patient alerts, automatically generating physician alerts, and/or the like.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention address technical challenges associated with reducing computational complexity of performing online predictive data analysis with respect to a document data object having C utterances by enabling techniques that enable sequential comparison of predictive outputs across N*C utterance-code pairs (where N describes a number of defined reason codes). In some embodiments (e.g., during an online generation of a hybrid reason code prediction for a document data object, such as during a real-time and/or a near-real-time generation of a hybrid reason code prediction for a document data object), by enabling sequential comparison of predictive outputs across N*C utterance-code pairs, various embodiments of the present invention reduce the complexity of computational operations that need to be performed during each iteration from O(N*C) to O(N), thus reducing the amount of computational resources that are needed to perform comparison of predictive outputs across N*C utterance-code pairs at each time. In this way, various embodiments of the present invention make important technical contributions to improving computational efficiency of existing natural language processing systems.

FIG. 4 is a block diagram of an example of a hybrid reason code prediction machine learning framework 400 that can be used to generate a hybrid reason code prediction for a document data object with respect to N reason codes. As depicted in FIG. 4, the hybrid reason code prediction machine learning framework 400 comprises: (i) a hierarchical transformer machine learning model 401, (ii) an utterance prediction machine learning model 402, (iii) an attention distribution generation machine learning model 403, (iv) an utterance-code pair prediction machine learning model 404, and (v) a hybrid prediction machine learning model 405.

In some embodiments, the hierarchical transformer machine learning model 401 is configured to determine, for each utterance of C utterances of a document data object, a respective utterance hidden representation that may be a fixed-size representation of the utterance. In some embodiments, the hierarchical transformer machine learning model 401 comprises a Hierarchical Bidirectional Encoder Representations from Transformers (HIBERT) machine model. Aspects of HIBERT models are described in Zhang et al., *HIBERT: Document Level Pre-training of Hierarchical Bidirectional Transformers for Document Summarization* (2019), arXiv:1905.06566v1.

In some embodiments, the hierarchical transformer machine learning model 401 has the architecture that is depicted in FIG. 5. As depicted in FIG. 5, the hierarchical transformer machine learning model 401 comprises a positional word embedding layer 501 that is configured to generate a positional word embedding for each word of an utterance of the document data object. In some embodiments, the positional word embedding is a fixed-size representation of a respective word in a respective utterance that describes both a word embedding for the respective word and a word-level positional embedding for a positional indicator of the respective word that describes a respective position of the respective word in an ordered sequence of one or more words of the respective utterance. In some embodiments, the word embeddings of words are a trained as part of training the hybrid reason code prediction machine learning framework 400, but are initialized to word embeddings generated using a pretrained word embedding generation machine learning model, such as a pretrained Word2Vec machine learning model. In some embodiments, positional embeddings of particular positional indicators are generated using sine-cosine positional embedding. Aspects of the Word2Vec word embedding generation techniques are described in Mikolov et al., *Distributed Representations of Words and Phrases and their Compositionality* in Advances in Neural Information Processing Systems 26 (2013 Conference on Neural Information Processing Systems (NIPS)). Aspects of sine-cosine positional embedding techniques are described in Vaswani et al., *Attention Is All You Need* in Advances in Neural Information Processing Systems, pages 5998-6008.

As depicted in FIG. 5, the positional word embedding layer 501 is configured to generate, for an ith utterance comprising an ordered sequence of $|S_i|$ words including a fixed/predefined end-of-utterance token at the end of the ordered sequence, a positional word embedding vector $E_i = (e_1^i, e_2^i, \ldots, e_{|S_i|}^i)$, where each $e_j^i$ is the word embedded representation for a jth word of the ith utterance. In some embodiments, the $e_j^i$ is generated using the equation $e_j^i = e(w_i^j) + p_j$, where e is a predefined function (e.g., characterized by one or more trained parameters, $w_i^j$ is the word embedding for the jth word of the ith utterance, and $p_j$ is the word-level positional embedding for the jth word of the ith utterance. As further depicted in FIG. 5, the positional word embedding layer 501 is further configured to generate, for each ith utterance of the document data object, a positional word embedding vector hidden representation by mapping the positional word embedding vector for the ith utterance (e.g., the $E_i$ vector) to an $|S_i|$-dimensional hidden representation space. Accordingly, as depicted in FIG. 5, the output of the positional word embedding layer 501 is, for each ith utterance comprising an ordered sequence of $|S_i|$ words including an end-of-utterance token, a positional word embedding vector hidden representation including a list of word-level hidden representations of the positional word embeddings of the $|S_i|$ words, e.g., the positional embedding vector hidden representation vector $(h_1^i, h_2^i, \ldots, h_{|S_i|}^i)$, where each $h_j^i$ is the hidden representation of the positional word embedding for a jth for an ith utterance (i.e., the hidden representation of the $e_j^i$ described above).

As further depicted in FIG. 5, the hierarchical transformer machine learning model 401 further includes a positional utterance embedding layer 502 that is configured to: (i) receive C positional word embedding vector hidden representations for C utterances of the document data object, (ii) for each utterance of the C utterances, determine an utterance embedding based at least in part on the positional word embedding vector hidden representation for the utterance (e.g., based at least in part on a final value of the positional word embedding vector hidden representation for the utterance that describes the hidden representation of the positional word embedding for the end-of-utterance token of the utterance), (iii) for each utterance of the C utterances, determine an utterance hidden representation based at least in part on the utterance embedding for the utterance and an utterance-level positional indicator for the utterance within an ordered sequence of the C utterances, (iv) combine the C utterance hidden representations for the C utterances to generate a positional utterance embedding vector for the document data object, and (iv) generate a document hidden representation for the document data object by mapping the positional utterance embedding vector for the document data object to a C-dimensional hidden representation space. In some embodiments, the hierarchical transformer machine learning model 401 is further configured to determine, based at least in part on each utterance hidden representation for the C utterances of the document data object, a document hidden representation for the document data object.

In some embodiments, the utterance embedding for an utterance describes the final value of the positional embedding vector hidden representation vector for the utterance (e.g., the $h_{|S_i|}{}^i$ for an ith utterance, as described above). In some embodiments, the utterance hidden representation for an ith utterance is determined using the equation $\hat{h}_i = h_{|S_i|}{}^i + p_i$, where $\hat{h}_i$ is the utterance hidden representation for the ith utterance, $h_{|S_i|}$ is the utterance embedding for the ith utterance that is determined based at least in part on a final value of the positional embedding vector hidden representation vector for the ith utterance, and $p_i$ is the utterance-level positional embedding for an utterance-level positional indicator of the ith utterance that describes a position of the ith utterance with an ordered sequence of the C utterances described by the document data object. In some embodiments, positional embeddings of particular positional indicators are generated using sine-cosine positional embedding. Aspects of sine-cosine positional embedding techniques are described in Vaswani et al., *Attention Is All You Need* in Advances in Neural Information Processing Systems, pages 5998-6008.

In some embodiments, the hierarchical transformer machine learning model 401 has the architecture that is depicted in FIG. 13. As depicted in FIG. 13, each utterance (i.e., denoted as $utt_i$) of a call transcript is first processed on a word-by-word level by a set of per-word utterance transformers 1301 and using a cross-word attention mechanism to generate a positional word embedding vector for the respective utterance, and the positional word embedding vectors are then processed by a set of call transformers 1302 and using a cross-utterance attention mechanism to generate a positional utterance embedding vector for the call transcript as a whole.

Returning to FIG. 4, the utterance prediction machine learning model 402 is configured to generate, for each utterance of C utterances of the document data object, an utterance markedness likelihood value that describes a predicted likelihood that the utterance is the single utterance of the C utterances that best describes the association of the document data object with a selected reason code for the document data object. In some embodiments, the utterance prediction machine learning model 402 is configured to, for each utterance, process the utterance hidden representation of the utterance to generate an value that describes a likelihood that the utterance is the most reason-code-indicative utterance of the C utterances of the document data object.

In some embodiments, the utterance prediction machine learning model 402 is configured to perform, with respect to each ith utterance, the steps/operations of the process that is depicted in FIG. 6 in order to generate the utterance markedness likelihood value for the noted utterance. The process that is depicted in FIG. 6 begins at step/operation 601 when the utterance prediction machine learning model 402 identifies $\hat{h}_i$, which is the utterance hidden representation for the ith utterance, as generated by the hierarchical transformer machine learning model 401.

At step/operation 602, the utterance prediction machine learning model 402 generates a cross-code utterance context vector for the ith utterance based at least in part on a plurality of normalized per-code utterance importance values for the ith utterance across the N reason codes. In some embodiments, each per-code utterance importance value describes an estimated/inferred/predicted likelihood for a respective utterance with respect to a given reason code. In some embodiments, the per-code utterance importance value for an ith utterance and an nth reason code is determined using the equation $a_{i,n} = \hat{h}_i^T x_n$, where $a_{i,n}$ is the per-code utterance importance value for the ith utterance and the nth reason code, $h_i^T$ is the transposed utterance hidden representation for the ith utterance, and $x_n$ is a reason code representation for the nth reason code. In some embodiments, each ith utterance is associated with N per-code utterance importance values across N reason codes, and the N per-code utterance importance values can then be normalized (e.g., using a softmax operation) to generate N normalized per-code utterance importance value. In some embodiments, the normalized per-code utterance importance value for an ith utterance and an nth reason code is determined using the equation $$a'_{i,n} = \frac{\exp(a_{ni})}{\sum_{j=1}^{N} \exp(a_{i,j})},$$

where $a'_{i,n}$ is the normalized per-code utterance importance value for the ith utterance and the nth reason code, $a_{i,n}$ is the per-code utterance importance value for the ith utterance and the nth reason code, and j is an index variable that iterates over N reason codes.

In some embodiments, once N per-code utterance importance values are generated for an ith utterance across N reason codes, the N per-code utterance importance values can be combined to generate a cross-code context vector for the ith utterance. For example, the cross-code context vector for the ith utterance can be generated using the equation $$x'_i = \sum_{j=1}^{N} a'_{i,j} x_j,$$

where $x'_i$ is the cross-code context vector for the ith utterance, $a'_{i,j}$ is the normalized per-code utterance importance value for the ith utterance and a jth reason code, $x_j$ is the reason code hidden representation for a jth reason code, and j is an index variable that iterates over N reason codes.

At step/operation 603, the utterance prediction machine learning model 402 generates the utterance markedness likelihood value for the ith utterance based at least in part on the utterance hidden representation for the ith utterance and the cross-code utterance context vector for the ith utterance. In some embodiments, to generate the utterance markedness likelihood value for the ith utterance, the utterance prediction machine learning model 402 generates a concatenation vector by concatenating the utterance hidden representation for the ith utterance and the cross-code utterance context vector for the ith utterance, and then processes the concatenation vector using trained parameters of the utterance prediction machine learning model 402 to generate the utterance markedness likelihood value for the ith utterance. In some embodiments, to generate the utterance markedness likelihood value for the ith utterance, the utterance prediction machine learning model 402 performs the operations of the following equation: $P(u_i) = \sigma(w_a^T[x'_i; \hat{h}_i] + b_a)$, where $x'_i$ is the cross-code context vector for the ith utterance, $\hat{h}_i$ is the utterance hidden representation for the ith utterance, $[x'_i; \hat{h}_i]$ is the concatenation vector generated by concatenating $x'_i$ and $\hat{h}_i$, $w_a^T$ is the transpose matrix generated by transposing the trained parameter matrix $w_a$, $b_a$ is a trained parameter vector, $\sigma$ is an activation function such as the sigmoid function, $u_i$ is the ith utterance, and $P(u_i)$ is the utterance markedness likelihood value for $u_i$.

Returning to FIG. 4, the attention distribution generation machine learning model 403 is configured to generate a normalized attention distribution for each utterance-code pair that comprises an ith utterance of the C utterances of the document data object and an nth reason code of the N reason codes. In some embodiments, given C utterances and N reason codes, C*N utterance-code pairs are generated comprising each possible pairings of an utterance and a reason code. Afterward, for each utterance-code pair of the C*N utterance-code pairs, a normalized attention distribution is generated.

In some embodiments, to generate the normalized attention distribution for a particular utterance-code pair that comprises an ith utterance of the C utterances of the document data object and an nth reason code of the N reason codes, the attention distribution generation machine learning model 403 performs the steps/operations of the process that is depicted in FIG. 7. The process that is depicted in FIG. 7 begins at step/operation 701 when the attention distribution generation machine learning model 403 retrieves an utterance hidden representation for the ith utterance and a reason code hidden representation for the nth reason code.

At step/operation 702, the attention distribution generation machine learning model 403 processes the utterance hidden representation for the ith utterance and the reason code hidden representation for the nth reason code using trained parameters of the attention distribution generation machine learning model 403 to generate an attention distribution for the particular utterance-code pair. In some embodiments, to generate the attention distribution for the particular utterance-code pair that comprises the ith utterance of the C utterances of the document data object and the nth reason code of the N reason codes, operations corresponding to the following equation are performed: $c_{n,i} = v^T (W_h \hat{h}_i + W_x x_n + b_p)$, where $c_{n,i}$ is the attention distribution for the particular utterance-code pair that comprises the ith utterance of the C utterances of the document data object and the nth reason code of the N reason codes, $\hat{h}_i$ is the utterance code representation for the ith utterance, $x_n$ is the reason code hidden representation for the nth reason code, each of $v$, $W_h$, $W_x$ is a matrix comprising a set of trained parameters of the attention distribution generation machine learning model 403, and $b_p$ is a vector comprising a set of trained parameters of the attention distribution generation machine learning model 403.

At step/operation 703, the attention distribution generation machine learning model 403 normalizes (e.g., using softmax normalization) the attention distribution for the particular utterance-code pair across C attention distributions for the nth reason code across the C utterances to generate the normalized attention distribution for the particular utterance-code pair. In some embodiments, to generate the normalized attention distribution for the particular utterance-code pair that is associated with an ith utterance and an nth reason code, the operations corresponding to the following equation are performed:

$$c'_{n,i} = \frac{\exp(c_{ni})}{\sum_{j=1}^{c} \exp(c_{n,j})},$$

where $c'_{n,i}$ is the normalized attention distribution for the particular utterance-code pair that comprises the ith utterance of the C utterances of the document data object and the nth reason code of the N reason codes, exp(.) is the exponential function, $c_{n,i}$ is the attention distribution for the particular utterance-code pair that comprises the ith utterance of the C utterances of the document data object and the nth reason code of the N reason codes, and j is an index variable that iterates over C utterances of the document data object.

Returning to FIG. 4, the utterance-code pair prediction machine learning model 404 is configured to generate a conditional code-to-utterance assignment likelihood value for each utterance-code pair that comprises an ith utterance of the C utterances of the document data object and an nth reason code of the N reason codes. In some embodiments, given C utterances and N reason codes, C*N utterance-code pairs are generated comprising each possible pairings of an utterance and a reason code. Afterward, for each utterance-code pair of the C*N utterance-code pairs, a conditional code-to-utterance assignment likelihood value is generated.

In some embodiments, to generate the conditional code-to-utterance assignment likelihood value for a particular utterance-code pair that comprises an ith utterance of the C utterances of the document data object and an nth reason code of the N reason codes, the utterance-code pair prediction machine learning model 404 performs the steps/operations of the process that is depicted in FIG. 8. The process that is depicted in FIG. 8 begins at step/operation 801 when the utterance-code pair prediction machine learning model 404 generates a cross-utterance context vector for the nth reason code based at least in part on the C normalized attention distributions for the nth reason code across the C utterances of the document data object.

As described above, in some embodiments, the attention distribution generation machine learning model 403 generates a normalized attention distribution for each utterance-code pair that comprises a respective utterance of C utterances as well as a respective reason code of N reason codes. Accordingly, the attention distribution generation machine learning model 403 generates, for each nth reason code, C normalized attention distributions across the C utterances. In some embodiments, the C normalized attention distributions associated with an nth reason are combined to generate the cross-utterance context vector for the nth reason code. For example, in some embodiments, the cross-utterance context vector for the nth reason code can be generated using the operations of the following equation:

$$h'_n = \sum_{j=1}^{c} c'_{n,j} \hat{h}_j,$$

where $h'_n$ is the cross-utterance context vector for the nth reason code, $c'_{n,j}$ is the normalized attention distribution for the nth reason code and a jth utterance, $\hat{h}_j$ is the utterance hidden representation for the jth utterance, and j is an index variable that iterates over C utterances of the document data object.

At step/operation 802, the utterance-code pair prediction machine learning model 404 generates a concatenation vector by concatenating the utterance hidden representation for the ith utterance that is associated with the particular utterance-code pair (i.e., $\hat{h}_i$), the cross-utterance context vector for the nth reason code that is associated with the particular utterance-code pair (i.e., h'$_n$), and the reason code hidden representation for the nth reason code that is associated with the particular utterance-code pair (i.e., x$_n$).

At step/operation 803, the utterance-code pair prediction machine learning model 404 generates the conditional code-to-utterance assignment likelihood value for the particular utterance-code pair based at least in part on the concatenation vector generated at the preceding step/operation, where the conditional code-to-utterance assignment likelihood value describes a likelihood of assigning the reason code associated with the particular utterance-code pair to the document data object given the assumption that the utterance associated with the particular utterance-code pair is the marked utterance for the document data object. In some embodiments, to generate the conditional code-to-utterance assignment likelihood value for the particular utterance-code pair that is associated with an ith utterance and an nth reason code, the utterance-code pair prediction machine learning model 404 performs operations of the equation: $P(r_n|u_i) = \sigma(w_n^T[\hat{h}_i; h'_n; x_n] + b_n)$, where $r_n$ is the nth reason code, $u_i$ is the ith utterance, $P(r_n|u_i)$ is the conditional code-to-utterance assignment likelihood value for the utterance-code pair comprising $r_n$ and $u_i$, $\sigma$ is an activation function such as a sigmoid activation function, $w_n$ is a matrix of trained parameters of the utterance-code pair prediction machine learning model 404, $\hat{h}_i$ is the utterance hidden representation for the ith utterance, h'$_n$ is the cross-utterance context vector for the nth reason code, $x_n$ is the reason code hidden representation for the nth reason code, $[\hat{h}_i; h'_n; x_n]$ is the concatenation vector generated by concatenating $\hat{h}_i$, h'$_n$, and $x_n$, and $b_n$ is a vector of trained parameters of the utterance-code pair prediction machine learning model 404.

Returning to FIG. 4, the hybrid prediction machine learning model 405 generates a hybrid reason code assignment likelihood value for each utterance-code pair that comprises an ith utterance of the C utterances of the document data object and an nth reason code of the N reason codes. In some embodiments, to generate hybrid reason code assignment likelihood value for an utterance-code pair that is associated with an ith utterance and an nth reason code, the hybrid prediction machine learning model 405 uses (e.g., multiplies) the utterance markedness likelihood value for the ith utterance and the conditional code-to-utterance assignment likelihood value for the utterance-code pair. In some embodiments, to generate hybrid reason code assignment likelihood value for an utterance-code pair that is associated with an ith utterance and an nth reason code, the hybrid prediction machine learning model 405 performs the operations of the following equation: $P(r_n, u_i) = P(r_n|u_i) * P(u_i)$, where $r_n$ is the nth reason code, $u_i$ is the ith utterance, $P(r_n|u_i)$ is the conditional code-to-utterance assignment likelihood value for the utterance-code pair comprising $r_n$ and $u_i$, $P(u_i)$ is the utterance markedness likelihood value for $r_n$, and $P(r_n, u_i)$ is the hybrid reason code assignment likelihood value for the utterance-code pair comprising $r_n$ and $u_i$.

In some embodiments, the hybrid reason code prediction machine learning framework 400 is trained in an end-to-end manner by updating parameters of the hybrid reason code prediction machine learning framework 400 to minimize (e.g., to globally minimize, to locally minimize using one or more gradient descent routines, and/or the like) a loss function for the hybrid reason code prediction machine learning framework 400, where the loss function is determined by combining (e.g., using a convex combination) a first loss function associated with the utterance prediction machine learning model 402 and a second loss function associated with the utterance-code pair prediction machine learning model 404. In some embodiments, the first loss function associated with the output of the utterance prediction machine learning model 402 is characterized by operations of Equation 1:

$$L_1(\theta_1) = \sum_{l=1}^{\tau} \sum_{i=1}^{C_l} CE(P(u_i^{(l)}), y_i^{(l)}) \qquad \text{Equation 1}$$

In Equation 1, $L_1$ is the first loss function associated with the utterance prediction machine learning model 402, l is an index variable that iterates over $\tau$ data objects in a training batch, $C_l$ is the number of utterances in a particular lth document data object in the training batch, i is an index variable that iterates over the $C_l$ utterances in a particular lth document data object in the training batch, CE(.,.) is a cross-entropy loss calculation function, $P(u_i^{(l)})$ is the utterance markedness likelihood value for an ith utterance of an lth document data object as generated by the utterance prediction machine learning model 402, and $y_i^{(l)}$ is a function that returns a first value (e.g., one) if the ground-truth label for an ith utterance of an lth document data object describes that the noted ith utterance is the ground-truth marked utterance of the lth document data object, and returns a second value (e.g., zero) if the ground-truth label for an ith utterance of an lth document data object describes that the noted ith utterance is not the ground-truth marked utterance of the lth document data object. Moreover, in Equation 1, $\theta_1$ describes the trainable parameters of the hybrid reason code prediction machine learning framework 400 whose values are used to generate utterance markedness likelihood values for particular utterances.

In some embodiments, the second loss function associated with the output of the utterance-code pair prediction machine learning model 404 is characterized by the operations of the Equation 2:

$$L_2(\theta_2) = \sum_{l=1}^{\tau} \sum_{n=1}^{N} \sum_{i=1}^{C_l} (P(r_n^{(l)}|u_i^{(l)}), z_{i,n}^{(l)}) \qquad \text{Equation 2}$$

In Equation 2, $L_2$ is the second loss function associated with the utterance-code pair prediction machine learning model 404, l is an index variable that iterates over $\tau$ document data objects in a training batch, $C_l$ is the number of utterances in a particular lth document data object in the training batch, i is an index variable that iterates over the $C_l$ utterances in a particular lth document data object in the training batch, n is an index variables that iterates over N reason codes, CE(.,.) is a cross-entropy loss calculation function, $P(r_n^{(l)}|u_i^{(l)})$ is the conditional code-to-utterance assignment likelihood value for an utterance-code pair comprising an nth reason code and an ith utterance of an lth document data object as generated by the utterance-code pair prediction machine learning model 404, and $z_{i,n}^{(l)}$ is a function that: (i) returns a first value (e.g., one) if the ground-truth label for an utterance-code pair comprising an ith utterance and an nth reason code describes that the ith utterance is the ground-truth marked utterance for the lth document and the nth reason code is the ground-truth reason code for the lth document, and (ii) returns a second value (e.g., zero) otherwise. Moreover, in Equation 2, 2 describes the trainable parameters $\theta_2$ of the hybrid reason code prediction machine learning framework 400 whose values are used to generate conditional code-to-utterance assignment likelihood values for particular utterance-code pairs.

In some embodiments, the final loss function for the hybrid reason code prediction machine learning framework 400 is characterized by operations of Equation 3:

$$L(\theta) = \sum_{l=1}^{\tau}\sum_{n=1}^{N}\sum_{i=1}^{C_l}\left[\gamma CE(P(u_i^{(l)}),\, y_i^{(l)}) + ((1-\gamma)CE(P(r_n^{(l)}|u_i^{(l)}),\, z_{i,n}^{(l)}))\right] \quad \text{Equation 3}$$

In Equation 3, L is the loss function associated with the hybrid reason code prediction machine learning framework 400, l is an index variable that iterates over $\tau$ document data objects in a training batch, $C_l$ is the number of utterances in a particular lth document data object in the training batch, i is an index variable that iterates over the $C_l$ utterances in a particular lth document data object in the training batch, n is an index variables that iterates over N reason codes, CE(.,.) is a cross-entropy loss calculation function, $P(r_n^{(l)}|u_i^{(l)})$ is the conditional code-to-utterance assignment likelihood value for an utterance-code pair comprising an nth reason code and an ith utterance of an lth document data object as generated by the utterance-code pair prediction machine learning model 404, $z_{i,n}^{(l)}$ is a function that: (i) returns a first value (e.g., one) if the ground-truth label for an utterance-code pair comprising an ith utterance and an nth reason code describes that the ith utterance is the ground-truth marked utterance for the lth document and the nth reason code is the ground-truth reason code for the lth document, and (ii) returns a second value (e.g., zero) otherwise, $P(u_i^{(l)})$ is the utterance markedness likelihood value for an ith utterance of an lth document data object as generated by the utterance prediction machine learning model 402, and $y_i^{(l)}$ is a function that returns a first value (e.g., one) if the ground-truth label for an ith utterance of an lth document data object describes that the noted ith utterance is the ground-truth marked utterance of the lth document data object, and returns a second value (e.g., zero) if the ground-truth label for an ith utterance of an lth document data object describes that the noted ith utterance is not the ground-truth marked utterance of the lth document data object. Moreover, in Equation 3, $\theta$ describes the set of trainable parameters of the hybrid reason code prediction machine learning framework 400, while $\gamma$ describes a tuned and/or a trained (e.g., a predefined/preconfigured) loss component significance hyper-parameter associated with the hybrid reason code prediction machine learning framework 400, and further the value of $\gamma$ lies between 0 and 1.

As described above, the hybrid reason code prediction machine learning framework 400 generates, for each utterance-code pair that is associated with an utterance of a document data object and a reason code, a hybrid reason code assignment likelihood value. This may mean that, given a document data object having C utterances and N reason codes, C*N hybrid reason code assignment likelihood values for C*N utterance-code pairs may be generated. Once generated, the hybrid reason code assignment likelihood values can be used to generate a hybrid reason code prediction for the document data object that describes a selected utterance of the C utterances for the document data object and a selected reason code of N reason codes for the document data object.

In some embodiments, generating the hybrid reason code prediction for a document data object may be performed in accordance with the process 900 that is depicted in FIG. 9. The process 900 begins at step/operation 901 when the predictive data analysis computing entity 106 identifies a set of hybrid reason code assignment likelihood values associated with a set of utterance-code pairs for the document data object.

In some embodiments, when the predictive data analysis computing entity 106 is configured to process all of the C utterances associated with the document data object during a single iteration of the process 900 (i.e., when the predictive data analysis computing entity 106 is configured to process the C utterances associated with the document data object as a batch), given N reason codes, C*N hybrid reason code assignment likelihood values for C*N utterance-code pairs may be generated during each iteration of the process 900. The noted embodiments, referred to herein as offline processing embodiments, present all of the C utterances associated with a document data object to the predictive data analysis computing entity 106 during a single timestep. Accordingly, during the single timestep, the predictive data analysis computing entity 106 can generate N hybrid reason code assignment likelihood values for each of the C utterances, where the N hybrid reason code assignment likelihood values for a given utterance describe reason code assignment likelihood values for the given utterance across the N reason codes.

In some embodiments, when the predictive data analysis computing entity 106 is configured to process a document data object having C utterances during C iterations of the process 900 (i.e., where during each iteration, an incoming utterance is processed), given N reason codes, N hybrid reason code assignment likelihood assignments for N utterance-code pairs may be generated during each iteration of the process 900, where all of the N utterance-code pairs are associated with the incoming utterance and the N hybrid reason code assignment likelihood assignments are hybrid reason code assignment likelihood values for the incoming utterance describe reason code assignment likelihood values for the incoming utterance across the N reason code assignments. The noted embodiments, referred to herein as online processing embodiments, present a single incoming utterance to the predictive data analysis computing entity 106 during a single timestep. Accordingly, during the single timestep, the predictive data analysis computing entity 106 can generate N hybrid reason code assignment likelihood values for the incoming utterance, where the N hybrid reason code assignment likelihood values describe reason code assignment likelihood values for the incoming utterance across the N reason codes.

At step/operation 902, the predictive data analysis computing entity 106 determines a selected utterance-code pair of the set of utterance-code pairs for which hybrid reason code assignment likelihood values were generated at step/operation 901. In some embodiments, during the offline prediction embodiments described above, the selected utterance-code pair is the utterance-code pair that is associated with the highest hybrid reason code assignment likelihood value of the C*N hybrid reason code assignment likelihood values generated using the current iteration of the process 900. In other words, the predictive data analysis computing entity 106 selects the utterance-code pair that has the highest hybrid reason code assignment likelihood value among all of the hybrid reason code assignment likelihood values for all of the utterance-code pairs associated with a batch of C utterances for a document data object as the selected utterance-code pair.

In some embodiments, during the online prediction embodiments described above: (i) if the current iteration of the process 900 is an initial iteration that is associated with an initial utterance in the ordered sequence of C utterances associated with the document data object, then of all of the N hybrid reason code assignment likelihood values that are associated with utterance-code pairs for the initial utterance across the N reason codes, the highest hybrid reason code assignment likelihood value is identified and the utterance-code pair that is associated with the identified highest hybrid reason code assignment likelihood value is selected as the selected utterance-code pair, and (ii) if the current iteration of the process 900 is a non-initial jth iteration that is associated with a corresponding non-initial jth utterance in the ordered sequence of C utterances associated with the document data object, then of all of the N hybrid reason code assignment likelihood values that are associated with utterance-code pairs for the initial utterance across the N reason codes, the highest hybrid reason code assignment likelihood value is identified and the utterance-code pair that is associated with the identified highest hybrid reason code assignment likelihood value is selected as the selected utterance-code pair if the identified highest hybrid reason code assignment likelihood value is greater than (or alternatively greater than or equal to) the hybrid reason code assignment likelihood value for a selected utterance-code pair that is selected by a preceding iteration of the process 900. Accordingly, during a non-initial jth iteration that is associated with a corresponding non-initial jth utterance in the ordered sequence of C utterances associated with the document data object, if the identified highest hybrid reason code assignment likelihood value is smaller than or equal to (or alternatively smaller than) the hybrid reason code assignment likelihood value for a selected utterance-code pair that is selected by a preceding iteration of the process 900, then the selected utterance-code pair that is selected by a preceding iteration of the process 900 is maintained as the selected utterance-code pair for the C iterations of the process 900 across C utterances.

For example, consider a scenario in which a document data object is associated with an ordered sequence of utterances $\{u_1, u_2\}$ and two reason codes $r_1$ and $r_2$. According to an online prediction embodiment, the predictive data analysis computing entity 106 may determine, during a first iteration, two hybrid reason code assignment likelihood value: $P(u_1, r_1)$ for $u_1$ and $r_1$, and $P(u_1, r_2)$ for $u_1$ and $r_2$. Let us assume that $P(u_1, r_1) > P(u_1, r_2)$. Accordingly, after the first iteration, the utterance-code pair $(u_1, r_1)$ is selected as the selected utterance-code pair. During a second iteration, two other hybrid reason code assignment likelihood value: $P(u_2, r_1)$ for $u_2$ and $r_1$, and $P(u_2, r_2)$ for $u_2$ and $r_2$. Let us assume that $P(u_2, r_1) > P(u_2, r_2)$. In some embodiments: (i) if $P(u_2, r_1) > P(u_1, r_1)$, then the selected utterance-code pair generated by the first iteration (i.e., the utterance-code pair $(u_1, r_1)$) is replaced with $u_2$, $r_1$, and (ii) otherwise, the selected utterance-code pair generated by the first iteration (i.e., the utterance-code pair $(u_1, r_1)$) is maintained as the selected utterance code pair. In some embodiments: (i) if $P(u_2, r_1) > P(u_1, r_1)$, then the selected utterance-code pair generated by the first iteration (i.e., the utterance-code pair $(u_1, r_1)$) is replaced with $u_2$, $r_1$, and (ii) otherwise, the selected utterance-code pair generated by the first iteration (i.e., the utterance-code pair $(u_1, r_1)$) is maintained as the selected utterance code pair.

In some embodiments, by enabling sequential comparison of predictive outputs across N*C utterance-code pairs, various embodiments of the present invention reduce the complexity of computational operations that need to performed during each iteration from O(N*C) to O(N), thus reducing the amount of computational resources that are needed to perform comparison of predictive outputs across N*C utterance-code pairs at each time. In this way, various embodiments of the present invention make important technical contributions to improving computational efficiency of existing natural language processing systems.

In some embodiments, given C utterances, C-S iterations of the process 900 are performed, where S may be a user-defined initial utterance batch size value. In some embodiments, this means that, during a first iteration of the process 900, N*S hybrid reason code assignment likelihood values for N*S utterance-code pairs associated with the first S (e.g., 20) utterances in the ordered sequence of C utterances are generated, and the utterance-code associated with the highest hybrid reason code assignment likelihood value of the N*S hybrid reason code assignment likelihood values is selected as the selected utterance-code pair. Then, during each non-initial jth iteration that is associated with a corresponding non-initial (S+j)-th utterance in the ordered sequence of C utterances associated with the document data object, of all of the N hybrid reason code assignment likelihood values that are associated with utterance-code pairs for the initial utterance across the N reason codes, the highest hybrid reason code assignment likelihood value is identified and the utterance-code pair that is associated with the identified highest hybrid reason code assignment likelihood value is selected as the selected utterance-code pair if the identified highest hybrid reason code assignment likelihood value is greater than (or alternatively greater than or equal to) the hybrid reason code assignment likelihood value for a selected utterance-code pair that is selected by a preceding iteration of the process 900. Accordingly, during a non-initial jth iteration that is associated with a corresponding non-initial (S+j)th utterance in the ordered sequence of C utterances associated with the document data object, if the identified highest hybrid reason code assignment likelihood value is smaller than or equal to (or alternatively smaller than) the hybrid reason code assignment likelihood value for a selected utterance-code pair that is selected by a preceding iteration of the process 900, then the selected utterance-code pair that is selected by a preceding iteration of the process 900 is maintained as the selected utterance-code pair for the C-S iterations of the process 900 across C utterances.

At step/operation 903, the predictive data analysis computing entity 106 determines a hybrid reason code prediction for the document data object based at least in part on the selected utterance-code pair that is selected at step/operation 902. In some embodiments, the hybrid reason code prediction describes that utterance that is associated with the selected utterance-code pair as the marked/selected utterance for the document data object and the reason code that is associated with the selected utterance-code pair as the selected reason code for the document data object.

At step/operation 904, the predictive data analysis computing entity 106 performs one or more prediction-based actions based at least in part on the hybrid reason code prediction. In some embodiments, performing the prediction-based actions comprises generating user interface data for a prediction output user interface that is configured to describe the selected utterance that is associated with the hybrid reason code prediction and the selected reason code that is associated with the hybrid reason code prediction. An operational example of such a prediction output user interface 1000 is depicted in FIG. 10. As depicted in FIG. 10, the prediction output user interface 1000 displays: (i) content data 1001 for a document data object that describes a call transcript, (ii) the selected reason code 1002, and (iii) the selected utterance 1003 that may be deemed the most reason-code-revealing utterance of the underlying document data object.

Other examples of prediction-based actions that can be performed based at least in part on predictive output of the present invention (e.g., based at least in part on the hybrid reason code prediction) include performing automatic appointment scheduling operations based at least in part on the hybrid reason code prediction, generating automatic notifications for a recipient user profile, performing operational load balancing operations based at least in part on the hybrid reason code prediction, performing navigation operations based at least in part on the hybrid reason code prediction, and/or the like.

In some embodiments, to perform the prediction-based actions, the predictive data analysis computing entity 106 determines D investigation classifications for D document data objects based at least in part on the D hybrid reason code predictions for the D document data objects. Then, the count of document data objects that are associated with an affirmative investigation classification, along with a resource utilization ratio for each document data object, can be used to predict a predicted number of computing entities needed to perform post-prediction processing operations (e.g., automated investigation operations) with respect to the D document data objects. For example, in some embodiments, the number of computing entities needed to perform post-prediction processing operations (e.g., automated investigation operations) with respect to D document data objects can be determined based at least in part on the output of the equation:

$$R = \text{ceil}\left(\sum_{k}^{k=K} ur_k\right),$$

where R is the predicted number of computing entities needed to perform post-prediction processing operations with respect to the D document data object, ceil(.) is a ceiling function that returns the closest integer that is greater than or equal to the value provided as the input parameter of the ceiling function, k is an index variable that iterates over K document data objects among the D document data that are associated with affirmative investigative classifications, and $ur_k$ is the estimated resource utilization ratio for a kth document data object that may be determined based at least in part on a count of utterances/tokens/words in the kth document data object. In some embodiments, once R is generated, the predictive data analysis computing entity 106 can use R to perform operational load balancing for a server system that is configured to perform post-prediction processing operations (e.g., automated investigation operations) with respect to D document data objects. This may be done by allocating computing entities to the post-prediction processing operations if the number of currently-allocated computing entities is below R, and deallocating currently-allocated computing entities if the number of currently-allocated computing entities is above R.

Thus, as described above, various embodiments of the present invention address technical challenges associated with reducing computational complexity of performing online predictive data analysis with respect to a document data object having C utterances by enabling techniques that enable sequential comparison of predictive outputs across N*C utterance-code pairs (where N describes a number of defined reason codes). In some embodiments, by enabling sequential comparison of predictive outputs across N*C utterance-code pairs, various embodiments of the present invention reduce the complexity of computational operations that need to performed during each iteration from O(N*C) to O(N), thus reducing the amount of computational resources that are needed to perform comparison of predictive outputs across N*C utterance-code pairs at each time. In this way, various embodiments of the present invention make important technical contributions to improving computational efficiency of existing natural language processing systems.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
identifying, by one or more processors, a plurality of utterances of a document data object;
generating, by the one or more processors and an utterance prediction machine learning model, an utterance markedness likelihood value for an utterance of the plurality of utterances based at least in part on an utterance word embedding representation of the utterance;
generating, by the one or more processors and an utterance-code pair prediction machine learning model, a conditional code-to-utterance assignment likelihood value for an utterance-code pair associated with the utterance based at least in part on (i) the utterance word embedding representation, (ii) a reason code word embedding representation for a reason code of a plurality of reason codes, and (iii) a plurality of normalized attention distributions for the reason code across the plurality of utterances, wherein the conditional code-to-utterance assignment likelihood value represents a predicted probability of assigning the reason code to the document data object based at least in part on the utterance being a most semantically significant utterance for the document data object relative to one or more other utterances of the plurality of utterances;
generating, by the one or more processors and using a prediction machine learning model, a reason code assignment likelihood value for the utterance-code pair based at least in part on the utterance markedness likelihood value for the utterance and the conditional code-to-utterance assignment likelihood value for the utterance-code pair;
determining, by the one or more processors, a reason code prediction based at least in part on the reason code assignment likelihood value, wherein the reason code prediction describes a selected utterance of the plurality of utterances and a selected reason code of the plurality of reason codes; and initiating, by the one or more processors, the performance of one or more prediction-based actions based at least in part on the reason code prediction.

2. The computer-implemented method of claim 1, wherein each utterance word embedding representation is generated using a hierarchical transformer machine learning model.

3. The computer-implemented method of claim 2, wherein the hierarchical transformer machine learning model is configured to, for each given utterance that is associated with an ordered sequence of one or more words:

for each word, determine a positional word embedding based at least in part on a word embedding for the word and a word-level positional embedding for a word-level positional indicator of the word within the ordered sequence of one or more words;

determine, based at least in part on a positional word embedding vector comprising each positional word embedding, a positional word embedding vector hidden representation;

determine an initial utterance word embedding representation for the given utterance based at least in part on a final value of the positional word embedding vector hidden representation; and determine, based at least in part on the final value and an utterance-level positional embedding for an utterance-level positional indicator of the given utterance within an ordered sequence of the plurality of utterances, the utterance word embedding representation for the given utterance.

4. The computer-implemented method of claim 3, wherein the hierarchical transformer machine learning model is further configured to determine, based at least in part on each utterance word embedding representation, a document hidden representation for the document data object.

5. The computer-implemented method of claim 1, further comprising:

determining a selected utterance-code pair having a highest reason code assignment likelihood value among all of reason code assignment likelihood values for all of utterance-code pairs; and determining the selected utterance and the selected reason code based at least in part on the selected utterance-code pair.

6. The computer-implemented method of claim 1, further comprising:

determining a cross-code utterance context vector for the utterance based at least in part on a plurality of normalized per-code utterance importance values for the utterance across the plurality of reason codes; and processing the utterance word embedding representation for the utterance and the cross-code utterance context vector for the utterance using the utterance prediction machine learning model to generate the utterance markedness likelihood value for the utterance.

7. The computer-implemented method of claim 1, further comprising:

determining a cross-utterance context vector for the reason code associated with the utterance-code pair, wherein the cross-utterance context vector is generated based at least in part on the plurality of normalized attention distributions; and generating, using the utterance prediction machine learning model and based at least in part on the cross-utterance context vector for the reason code, the utterance word embedding representation of the utterance associated with the utterance-code pair, and the reason code word embedding representation for the reason code, the conditional code-to-utterance assignment likelihood value.

8. The computer-implemented method of claim 7, wherein each normalized attention distribution for a respective reason code and a respective utterance is determined based at least in part on an output of an attention distribution generation machine learning model that is generated via processing the utterance word embedding representation for the respective utterance and the reason code word embedding representation for the respective reason code.

9. A system comprising one or more processors and memory communicatively connected to the one or more processors, the one or more processors configured to:

identify a plurality of utterances of a document data object;

generate, by an utterance prediction machine learning model, an utterance markedness likelihood value for an utterance of the plurality of utterances based at least in part on an utterance word embedding representation of the utterance;

generate, by an utterance-code pair prediction machine learning model, a conditional code-to-utterance assignment likelihood value for an utterance-code pair associated with the utterance based at least in part on (i) the utterance word embedding representation, (ii) a reason code word embedding representation for a reason code of a plurality of reason codes, and (iii) a plurality of normalized attention distributions for the reason code across the plurality of utterances, wherein the conditional code-to-utterance assignment likelihood value represents a predicted probability of assigning the reason code to the document data object based at least in part on the utterance being a most semantically significant utterance for the document data object relative to one or more other utterances of the plurality of utterances;

generate, by a hybrid prediction machine learning model, a reason code assignment likelihood value for the utterance-code pair based at least in part on the utterance markedness likelihood value for the utterance and the conditional code-to-utterance assignment likelihood value for the utterance-code pair;

determine a reason code prediction based at least in part on the reason code assignment likelihood value, wherein the reason code prediction describes a selected utterance of the plurality of utterances and a selected reason code of the plurality of reason codes; and initiate the performance of one or more prediction-based actions based at least in part on the reason code prediction.

10. The system of claim 9, wherein each utterance word embedding representation is generated using a hierarchical transformer machine learning model.

11. The system of claim 10, wherein the hierarchical transformer machine learning model is configured to, for each given utterance that is associated with an ordered sequence of one or more words:

for each word, determine a positional word embedding based at least in part on a word embedding for the word and a word-level positional embedding for a word-level positional indicator of the word within the ordered sequence of one or more words;

determine, based at least in part on a positional word embedding vector comprising each positional word embedding, a positional word embedding vector hidden representation;

determine an initial utterance word embedding representation for the given utterance based at least in part on a final value of the positional word embedding vector hidden representation; and determine, based at least in part on the final value and an utterance-level positional embedding for an utterance-level positional indicator of the given utterance within an ordered sequence of the plurality of utterances, the utterance word embedding representation for the given utterance.

12. The system of claim 11, wherein the hierarchical transformer machine learning model is further configured to determine, based at least in part on each utterance word embedding representation, a document hidden representation for the document data object.

13. The system of claim 9, wherein the one or more processors are configured to:
determine a selected utterance-code pair having a highest reason code assignment likelihood value among all of hybrid reason code assignment likelihood values for all of utterance-code pairs; and
determine the selected utterance and the selected reason code based at least in part on the selected utterance-code pair.

14. The system of claim 9, wherein the one or more processors are configured to:
determine a cross-code utterance context vector for the utterance based at least in part on a plurality of normalized per-code utterance importance values for the utterance across the plurality of reason codes; and
process the utterance word embedding representation for the utterance and the cross-code utterance context vector for the utterance using the utterance prediction machine learning model to generate the utterance markedness likelihood value for the utterance.

15. The system of claim 9, wherein the one or more processors are configured to:
determine a cross-utterance context vector for the reason code associated with the utterance-code pair, wherein the cross-utterance context vector is generated based at least in part on the plurality of normalized attention distributions for the reason code across the plurality of utterances; and
generate, using the utterance prediction machine learning model and based at least in part on the cross-utterance context vector for the reason code, the utterance word embedding representation of the utterance associated with the utterance-code pair, and the reason code word embedding representation for the reason code, the conditional code-to-utterance assignment likelihood value.

16. The system of claim 15, wherein each normalized attention distribution for a respective reason code and a respective utterance is determined based at least in part on an output of an attention distribution generation machine learning model that is generated via processing the utterance word embedding representation for the respective utterance and the reason code word embedding representation for the respective reason code.

17. One or more non-transitory computer readable storage media comprising instructions, when executed by one or more processors, cause the one or more processors to:
identify a plurality of utterances of a document data object;
generate, by an utterance prediction machine learning model, an utterance markedness likelihood value for an utterance of the plurality of utterances based at least in part on an utterance word embedding representation of the utterance;
generate, by an utterance-code pair prediction machine learning model, a conditional code-to-utterance assignment likelihood value for an utterance-code pair associated with the utterance based at least in part on (i) the utterance word embedding representation, (ii) a reason code word embedding representation for a reason code of a plurality of reason codes, and (iii) a plurality of normalized attention distributions for the reason code across the plurality of utterances, wherein the conditional code-to-utterance assignment likelihood value represents a predicted probability of assigning the reason code to the document data object based at least in part on the utterance being a most semantically significant utterance for the document data object relative to one or more other utterances of the plurality of utterances;
generate, by a hybrid prediction machine learning model, a reason code assignment likelihood value for the utterance-code pair based at least in part on the utterance markedness likelihood value for the utterance and the conditional code-to-utterance assignment likelihood value for the utterance-code pair;
determine a reason code prediction based at least in part on the reason code assignment likelihood value, wherein the reason code prediction describes a selected utterance of the plurality of utterances and a selected reason code of the plurality of reason codes; and
initiate the performance of one or more prediction-based actions based at least in part on the reason code prediction.

18. The one or more non-transitory computer readable storage media of claim 17, wherein each utterance word embedding representation is generated using a hierarchical transformer machine learning model.

19. The one or more non-transitory computer readable storage media of claim 18, wherein the hierarchical transformer machine learning model is configured to, for each given utterance that is associated with an ordered sequence of one or more words:
for each word, determine a positional word embedding based at least in part on a word embedding for the word and a word-level positional embedding for a word-level positional indicator of the word within the ordered sequence of one or more words;
determine, based at least in part on a positional word embedding vector comprising each positional word embedding, a positional word embedding vector hidden representation;
determine an initial utterance word embedding representation for the given utterance based at least in part on a final value of the positional word embedding vector hidden representation; and
determine, based at least in part on the final value and an utterance-level positional embedding for an utterance-level positional indicator of the given utterance within an ordered sequence of the plurality of utterances, the utterance word embedding representation for the given utterance.

20. The one or more non-transitory computer readable storage media of claim 17, wherein the instructions, when executed by the one or more processors, further cause the one or more processors to:
  determine a cross-utterance context vector for the reason code associated with the utterance-code pair, wherein the cross-utterance context vector is generated based at least in part on the plurality of normalized attention distributions for the reason code across the plurality of utterances; and
  generate, using the utterance prediction machine learning model and based at least in part on the cross-utterance context vector for the reason code, the utterance word embedding representation of the utterance associated with the utterance-code pair, and the reason code word embedding representation for the reason code, the conditional code-to-utterance assignment likelihood value.

* * * * *